US012562966B2

(12) United States Patent
Madtha et al.

(10) Patent No.: US 12,562,966 B2
(45) Date of Patent: Feb. 24, 2026

(54) TRANSITIONING NETWORK ENTITIES ASSOCIATED WITH A VIRTUAL CLOUD NETWORK THROUGH A SERIES OF PHASES OF A CERTIFICATE BUNDLE DISTRIBUTION PROCESS

(71) Applicant: Oracle International Corporation, Redwood Shores, CA (US)

(72) Inventors: Jivan Joseph Madtha, Saratoga, CA (US); Bill Chau, Sammamish, WA (US); Suryanarayanan Balasubramanian, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 199 days.

(21) Appl. No.: 18/363,266

(22) Filed: Aug. 1, 2023

(65) Prior Publication Data

US 2024/0388510 A1      Nov. 21, 2024

Related U.S. Application Data

(60) Provisional application No. 63/467,662, filed on May 19, 2023.

(51) Int. Cl.
| | |
|---|---|
| *H04L 29/06* | (2006.01) |
| *H04L 9/40* | (2022.01) |
| *H04L 41/342* | (2022.01) |

(52) U.S. Cl.
CPC ........ *H04L 41/342* (2022.05); *H04L 63/0823* (2013.01)

(58) Field of Classification Search
CPC .......................... H04L 63/0823; H04L 41/342
See application file for complete search history.

(56) References Cited

U.S. PATENT DOCUMENTS

| | | | |
|---|---|---|---|
| 5,671,279 | A | 9/1997 | Elgamal |
| 5,699,431 | A | 12/1997 | Van Oorschot et al. |

(Continued)

FOREIGN PATENT DOCUMENTS

| | | |
|---|---|---|
| CN | 112019477 A | 12/2020 |
| CN | 114884963 A | 8/2022 |

(Continued)

OTHER PUBLICATIONS

Kathleen Nichols et al., Trust Schemas and ICN: Key to Secure Home IoT, Sep. 22, 2021, ACM, pp. 95-106. (Year: 2021).*

(Continued)

*Primary Examiner* — Kari L Schmidt
*Assistant Examiner* — Fahimeh Mohammadi
(74) *Attorney, Agent, or Firm* — Invoke

(57) ABSTRACT

Network entities associated with a virtual cloud network are transitioned through a certificate bundle distribution process for distributing new certificate authority certificates to the network entities. Operations may include executing, in relation to each of the network entities, a first operation associated with a first phase of the process; obtaining, for each particular network entity, individual entity information associated with a progress of a particular network entity in relation to the first phase; computing, based on the individual entity information, an aggregate metric indicative of an aggregate progress of the network entities in relation to the first phase; determining, based on the aggregate metric, that one or more transition criteria are satisfied for transitioning the network entities from the first phase to a second phase of the process; and executing, in relation to each of the network entities, a second operation associated with the second phase of the process.

83 Claims, 13 Drawing Sheets

(56)　　　　　References Cited

U.S. PATENT DOCUMENTS

| | | | |
|---|---|---|---|
| 7,272,714 B2 | 9/2007 | Nagaratnam et al. | |
| 7,644,270 B1 | 1/2010 | Cherukumudi et al. | |
| 8,176,328 B2 | 5/2012 | Chen et al. | |
| 8,452,958 B2 | 5/2013 | Sun et al. | |
| 9,172,543 B2* | 10/2015 | Wnuk | H04L 67/568 |
| 9,197,630 B2 | 11/2015 | Sharif et al. | |
| 9,231,933 B1 | 1/2016 | Shenoy et al. | |
| 9,485,101 B2 | 11/2016 | Bowen | |
| 9,660,978 B1 | 5/2017 | Truskovsky et al. | |
| 9,680,813 B2 | 6/2017 | Sade et al. | |
| 9,794,249 B1 | 10/2017 | Truskovsky et al. | |
| 9,882,727 B1 | 1/2018 | Veladanda et al. | |
| 10,021,084 B2 | 7/2018 | Matthews et al. | |
| 10,212,147 B2 | 2/2019 | Buendgen et al. | |
| 10,425,401 B1 | 9/2019 | Pecen et al. | |
| 10,439,825 B1* | 10/2019 | Meyer | H04L 9/30 |
| 10,447,683 B1 | 10/2019 | Loladia et al. | |
| 10,469,518 B1 | 11/2019 | Natanzon et al. | |
| 10,621,577 B2 | 4/2020 | Castinado et al. | |
| 10,652,030 B1* | 5/2020 | Levy | H04L 9/3268 |
| 10,764,263 B2 | 9/2020 | Rossi | |
| 10,771,261 B1 | 9/2020 | Lazar et al. | |
| 10,812,276 B2 | 10/2020 | Bojjireddy et al. | |
| 10,848,323 B2 | 11/2020 | Barr, III et al. | |
| 11,153,103 B2 | 10/2021 | Fynaardt et al. | |
| 11,190,504 B1 | 11/2021 | Ah Kun et al. | |
| 11,196,570 B2 | 12/2021 | Borne-Pons et al. | |
| 11,310,059 B2 | 4/2022 | Leibmann et al. | |
| 11,362,843 B1 | 6/2022 | Jiang et al. | |
| 11,368,314 B2 | 6/2022 | Ray et al. | |
| 11,388,594 B2 | 7/2022 | Uy et al. | |
| 11,438,325 B2 | 9/2022 | Begun et al. | |
| 11,477,011 B1* | 10/2022 | Pelton | H04L 9/3263 |
| 11,533,185 B1 | 12/2022 | Sharma et al. | |
| 11,627,123 B2 | 4/2023 | Stayskal et al. | |
| 11,706,038 B1 | 7/2023 | Thakore et al. | |
| 11,706,207 B1* | 7/2023 | Fynaardt | G06F 9/547 |
| 11,888,997 B1 | 1/2024 | Bowen et al. | |
| 12,088,738 B2 | 9/2024 | Rosenthol et al. | |
| 12,323,466 B1 | 6/2025 | Miseiko et al. | |
| 12,361,110 B1 | 7/2025 | Subramanian et al. | |
| 12,380,443 B1 | 8/2025 | Edwards et al. | |
| 2002/0007346 A1 | 1/2002 | Qiu et al. | |
| 2002/0029200 A1* | 3/2002 | Dulin | H04L 63/0823 |
| | | | 705/67 |
| 2002/0174066 A1 | 11/2002 | Kleckner et al. | |
| 2003/0037234 A1 | 2/2003 | Fu et al. | |
| 2006/0047965 A1 | 3/2006 | Thayer | |
| 2006/0101510 A1 | 5/2006 | Kadyk et al. | |
| 2007/0005956 A1* | 1/2007 | Zilinskas | H04L 9/3263 |
| | | | 713/173 |
| 2007/0016782 A1 | 1/2007 | Crall et al. | |
| 2007/0147619 A1 | 6/2007 | Bellows et al. | |
| 2010/0030897 A1 | 2/2010 | Stradling | |
| 2010/0325429 A1 | 12/2010 | Saha et al. | |
| 2011/0113239 A1 | 5/2011 | Fu et al. | |
| 2012/0036220 A1 | 2/2012 | Dare et al. | |
| 2012/0240192 A1 | 9/2012 | Orazi et al. | |
| 2012/0246466 A1 | 9/2012 | Salvarani et al. | |
| 2012/0278614 A1 | 11/2012 | Choi | |
| 2013/0086642 A1 | 4/2013 | Resch et al. | |
| 2013/0179676 A1* | 7/2013 | Hamid | G06F 21/335 |
| | | | 713/150 |
| 2013/0262857 A1* | 10/2013 | Neuman | H04L 63/0823 |
| | | | 713/155 |
| 2014/0298419 A1 | 10/2014 | Boubez et al. | |
| 2015/0135299 A1 | 5/2015 | Liang et al. | |
| 2015/0215308 A1 | 7/2015 | Manolov et al. | |
| 2015/0279132 A1 | 10/2015 | Perotti | |
| 2015/0288528 A1 | 10/2015 | Cho et al. | |
| 2015/0334110 A1 | 11/2015 | Bishop et al. | |
| 2015/0381374 A1* | 12/2015 | Zömbik | H04L 9/3268 |
| | | | 713/158 |
| 2016/0277923 A1 | 9/2016 | Steffey et al. | |

| | | | |
|---|---|---|---|
| 2017/0039373 A1 | 2/2017 | Sasin et al. | |
| 2017/0126667 A1 | 5/2017 | Bishop et al. | |
| 2017/0171191 A1* | 6/2017 | Cignetti | H04L 12/4625 |
| 2017/0177324 A1 | 6/2017 | Frank et al. | |
| 2017/0222981 A1 | 8/2017 | Srivastav et al. | |
| 2017/0279807 A1 | 9/2017 | Jos | |
| 2017/0317837 A1 | 11/2017 | Alrawais et al. | |
| 2017/0338967 A1 | 11/2017 | Lewison et al. | |
| 2017/0373860 A1 | 12/2017 | Kshirsagar et al. | |
| 2018/0019993 A1 | 1/2018 | Kravitz et al. | |
| 2018/0083966 A1 | 3/2018 | Zhou et al. | |
| 2018/0102904 A1 | 4/2018 | Lin et al. | |
| 2018/0287804 A1 | 10/2018 | Geisbush | |
| 2019/0026804 A1 | 1/2019 | Yin | |
| 2019/0149342 A1 | 5/2019 | Fynaardt et al. | |
| 2019/0165950 A1 | 5/2019 | Ibrahim | |
| 2019/0166635 A1 | 5/2019 | Mccolgan et al. | |
| 2019/0347406 A1 | 11/2019 | Lev-Ran | |
| 2019/0349402 A1 | 11/2019 | Shukla et al. | |
| 2019/0356494 A1 | 11/2019 | Chmara et al. | |
| 2019/0356817 A1 | 11/2019 | Bush et al. | |
| 2019/0363895 A1 | 11/2019 | Barr et al. | |
| 2019/0372783 A1 | 12/2019 | Martinez et al. | |
| 2020/0021575 A1* | 1/2020 | Rezvani | H04L 63/20 |
| 2020/0092095 A1 | 3/2020 | Yang et al. | |
| 2020/0150972 A1* | 5/2020 | Ketkar | G06F 9/44505 |
| 2020/0274718 A1 | 8/2020 | Hwang et al. | |
| 2020/0274862 A1 | 8/2020 | Varvarezis et al. | |
| 2020/0382323 A1 | 12/2020 | Keselman et al. | |
| 2020/0396089 A1 | 12/2020 | Guo et al. | |
| 2021/0034767 A1 | 2/2021 | Free et al. | |
| 2021/0051028 A1* | 2/2021 | Kapon | H04L 63/0823 |
| 2021/0126801 A1 | 4/2021 | Nix | |
| 2021/0152547 A1 | 5/2021 | Barhudarian et al. | |
| 2021/0211307 A1 | 7/2021 | Statia et al. | |
| 2021/0218723 A1 | 7/2021 | Lekov et al. | |
| 2021/0274348 A1* | 9/2021 | Yoon | H04L 63/0823 |
| 2021/0297259 A1 | 9/2021 | Rahn et al. | |
| 2021/0328814 A1 | 10/2021 | Wei et al. | |
| 2021/0392002 A1* | 12/2021 | Gray | H04L 9/3268 |
| 2021/0409403 A1 | 12/2021 | Lewin et al. | |
| 2021/0409409 A1 | 12/2021 | Palanisamy | |
| 2022/0014522 A1 | 1/2022 | Thomas et al. | |
| 2022/0029988 A1* | 1/2022 | Levin | H04L 63/0869 |
| 2022/0038894 A1 | 2/2022 | Yoon et al. | |
| 2022/0116229 A1 | 4/2022 | Jones et al. | |
| 2022/0123951 A1 | 4/2022 | Lutz et al. | |
| 2022/0150238 A1 | 5/2022 | Bhalerao | |
| 2022/0239503 A1 | 7/2022 | Mallikarjuna et al. | |
| 2022/0393886 A1 | 12/2022 | Williams et al. | |
| 2023/0007474 A1 | 1/2023 | Ni et al. | |
| 2023/0032867 A1 | 2/2023 | Peddada et al. | |
| 2023/0049095 A1 | 2/2023 | Rangaraj | |
| 2023/0062888 A1 | 3/2023 | Colombano | |
| 2023/0109231 A1 | 4/2023 | Adogla et al. | |
| 2023/0121514 A1 | 4/2023 | Smith | |
| 2023/0208655 A1 | 6/2023 | Statia et al. | |
| 2023/0237155 A1 | 7/2023 | Jacquin et al. | |
| 2023/0291574 A1 | 9/2023 | Held et al. | |
| 2023/0291577 A1 | 9/2023 | Thai et al. | |
| 2023/0401307 A1 | 12/2023 | Pop et al. | |
| 2023/0412397 A1 | 12/2023 | Gollent et al. | |
| 2024/0015508 A1 | 1/2024 | Yoon et al. | |
| 2024/0020373 A1 | 1/2024 | Ivanov et al. | |
| 2024/0031146 A1 | 1/2024 | Marosi-Bauer et al. | |
| 2024/0104192 A1 | 3/2024 | Kalle et al. | |
| 2024/0106886 A1* | 3/2024 | Roy | H04L 67/1029 |
| 2024/0121603 A1 | 4/2024 | Yoon et al. | |
| 2024/0146543 A1 | 5/2024 | Sahoo et al. | |
| 2024/0333640 A1 | 10/2024 | Shevade et al. | |
| 2024/0356763 A1 | 10/2024 | Goldberg et al. | |
| 2024/0364540 A1* | 10/2024 | Sai | H04L 9/3247 |
| 2024/0372731 A1 | 11/2024 | Kobel et al. | |
| 2024/0430249 A1 | 12/2024 | Singh et al. | |
| 2025/0030561 A1 | 1/2025 | Long et al. | |
| 2025/0088373 A1 | 3/2025 | Uzun et al. | |

(56) References Cited

U.S. PATENT DOCUMENTS

| | | |
|---|---|---|
| 2025/0097211 A1 | 3/2025 | Uzun et al. |
| 2025/0133401 A1 | 4/2025 | Lee et al. |

FOREIGN PATENT DOCUMENTS

| | | |
|---|---|---|
| EP | 1251670 A2 | 10/2002 |
| EP | 2267970 A2 | 12/2010 |
| EP | 2854349 A1 | 4/2015 |
| EP | 3772208 B1 | 9/2024 |
| KR | 10-2011-0045459 A | 5/2011 |
| WO | 2006/122024 A2 | 11/2006 |
| WO | 2007/117293 A2 | 10/2007 |
| WO | 2022/103890 A1 | 5/2022 |
| WO | 2022/121461 A1 | 6/2022 |
| WO | 2022/133026 A1 | 6/2022 |
| WO | 2023/240360 A1 | 12/2023 |
| WO | 2025/059187 A1 | 3/2025 |

OTHER PUBLICATIONS

Jude Nelson et al., Syndicate: Virtual Cloud Storage through Provider Composition, Jun. 23, 2014, ACM, pp. 1-8. (Year: 2014).*

Zhilou Yu et al., A Cloud Certificate Authority Architecture for Virtual Machines with Trusted Platform Module, Nov. 30, 2015, IEEE, pp. 1377-1380. (Year: 2015).*

Bingyu Li et al., Locally-Centralized Certificate Validation and Its Application in Desktop Virtualization Systems, Nov. 2, 2020, IEEE, vol. 16, pp. 1380-1395. (Year: 2020).*

"What is Certificate Lifecycle Management", Retrieved from https://www.encryptionconsulting.com/different-phases-of-a-certificate-lifecycle-management-process/, Aug. 1, 2024, pp. 1-12.

"About Azure Key Vault certificates", Retrieved from https://learn.microsoft.com/en-US/azure/key-vault/certificates/about-certificates, Feb. 8, 2023, pp. 1-8.

"About the Expressway", Aug. 17, 2022. pp. 1-12.

"Automated certificate management for TLS certificates", Retrieved from https://docs.servicenow.com/en-US/bundle/utah-it-operations-management/page/product/discovery/concept/automated-cert-requests.html, Retrieved on May 4, 2023, pp. 1-4.

"AWS Certificate Manager FAQs", Retrieved from https://aws.amazon.com/certificate-manager/faqs/, Retrieved on Mar. 24, 2023, pp. 1-17.

"Azure Instance Metadata Service", Retrieved from https://learn.microsoft.com/en-US/azure/virtual-machines/instance-metadata-service?tabs=windows, Mar. 15, 2023, pp. 1-42.

"Cisco Expressway Certificate Creation and Use Deployment Guide", Feb. 23, 2021, pp. 10.

"Deploying the CA bundle iApp", Retrieved from https://www.f5.com/pdf/deployment-guides/f5-ca-bundle-dg.pdf, Dec. 14, 2017, pp. 1-9.

"DigiCert Public Key Infrastructure (PKI) Platform", 2019, pp. 15.

"Get started with Key Vault certificates", Retrieved from https://learn.microsoft.com/en-US/azure/key-vault/certificates/certificate-scenarios, Retrieved on Feb. 1, 2023, pp. 1-6.

"High Availability using Patching and Rolling AP Upgrade on Cisco Catalyst 9800 Wireless Controllers", Copyright 2020, pp. 1-41.

"Manage Certificate Revocation Lists (CRLs)", Jul. 23, 2021, pp. 1-4.

"PKI secrets engine", Retrieved from https://developer.hashicorp.com/vault/docs/secrets/pki, Retrieved on May 4, 2023, pp. 1-3.

"Planning a certificate revocation list (CRL)", Retrieved from https://docs.aws.amazon.com/privateca/latest/userguide/crl-planning.html, Retrieved on Jul. 28, 2023, pp. 11.

"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.

"Release Your App Update in a Staged Rollout", Retrieved from https://developer.amazon.com/docs/app-submission/release-updates-in-staged-rollouts.html, Retrieved on Apr. 27, 2023, pp. 1-18.

"Rotate Security Certificates", Retrieved from https://www.cockroachlabs.com/docs/stable/rotate-certificates, Retrieved on May 4, 2023, pp. 1-6.

"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.

"Staged upgrade", Retrieved from https://www.IBM.com/docs/en/order-management-sw/9.4.0?topic=migrating-staged-upgrade, Mar. 2, 2021, pp. 1-3.

"Troubleshoot SSL certificates", Retrieved from https://cloud.google.com/load-balancing/docs/ssl-certificates/troubleshooting, Retrieved on Mar. 24, 2023, pp. 1-8.

"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.

"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.

"Updating your private CA", Retrieved from https://docs.aws.amazon.com/privateca/latest/userguide/PCAUpdateCA.html, Retrieved on Mar. 24, 2023, pp. 1-4.

"Use self-managed SSL certificates", Retrieved from https://cloud.google.com/load-balancing/docs/ssl-certificates/self-managed-certs, Aug. 15, 2023, pp. 13.

"vSphere Security", vmware, Update 3, Mar. 21, 2023, pp. 1-426.

"Working with Hosts", Retrieved from https://docs.cloudstack.apache.org/projects/archived-cloudstack-administration/en/latest/hosts.html, Retrieved on Mar. 24, 2023, pp. 1-7.

Atutxa et al., "Improving efficiency and security of IIoT communications using in-network validation of server certificate", Computers in Industry, vol. 144, Jan. 2023, 103802, pp. 30.

Bigelow S.J., "Rolling deployment", Retrieved from https://www.techtarget.com/searchitoperations/definition/rolling-deployment, Jan. 2023, pp. 4.

Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.

Ghanmi et al., "A Secure Data Storage in Multi-cloud Architecture Using Blowfish Encryption Algorithm", Advanced Information Networking and Applications, Mar. 2022, pp. 398-408.

Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.

Manjusha R. et al., "Secure Authentication and Access System for Cloud Computing Auditing Services Using Associated Digital Certificate", Indian Journal of Science and Technology, vol. 8 (S7), Apr. 2015, pp. 220-227.

Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, pp. 10.

Rowley J., "Google's Moving Forward Together Proposals for Root CA Policy: Rotating ICAS More Frequently", Retrieved from https://www.digicert.com/blog/googles-moving-forward-together-proposals-for-root-ca-policy, Mar. 22, 2023, pp. 1-11.

Subhayu, "Different Phases of a Certificate Lifecycle Management Process for a secure WPA2-Enterprise network", Certificate Lifecycle Management Oct. 6, 2022, pp. 16.

Ylonen et al., "Security of Automated Access Management Using Secure Shell (SSH)", NISTIR 7966 (Draft), Aug. 2014, pp. 43.

Ylonen et al., "Security of Automated Access Management Using Secure Shell (SSH)", National Institute of Standards and Technology Interagency or Internal Report 7966, Aug. 2014, pp. 43.

Albert Wasef et al., DCS: An Efficient Distributed-Certificate-Service Scheme for Vehicular Networks, Feb. 2010, IEEE, vol. 59, Issue: 2, pp. 533-549. (Year: 2010).

(56)    References Cited

OTHER PUBLICATIONS

Artem Dinaburg et al., Ether: Malware Analysis via Hardware Virtualization Extensions, Oct. 27, 2008, ACM, pp. 51-62. (Year: 2008).

Capt James M. Hayes, Secure In-band Update of Trusted Certificates, Aug. 6, 2002, IEEE, pp. 1-6. (Year: 2002).

Kumagai et al., "Distributed Public Key Certificate-Issuing Infrastructure for Consortium Certificate Authority Using Distributed Ledger Technology", Security and Communication Networks, vol. 2023, Article ID 9559439, Jun. 7, 2023, pp. 1-20.

Marco Anisetti et al., Test-Based Security Certification of Composite Services, Dec. 4, 2018, vol. 13, Issue 1, pp. 1-43. (Year: 2018).

Yi, Seunghee, (WO2023/227228 , "Method and Apparatus for Canary deployment in Gnodeb,"), Nov. 30. 2023. pp. 1-17. (Year: 2023).

Yu et al., "A Cloud Certificate Authority Architecture for Virtual Machines with Trusted Platform Module", 2015 IEEE 17th International Conference on High Performance Computing and Communications, 2015 IEEE 7th International Symposium on Cyberspace Safety and Security, and 2015 IEEE 12th International Conference on Embedded Software and Systems, 2015, pp. 1377-1380.

* cited by examiner

700

Phase 1: distribute a new certificate bundle including a new set of CA certificates to a set of network entities associated with a virtual cloud network

702

Has the new certificate bundle been successfully distributed?

No

704

Yes

Phase 2: activate new CA certificates in the new certificate bundle

706

Phase 3: distribute new entity certificates to the set of network entities

708

Have the new entity certificates been successfully distributed?

No

710

Yes

Phase 4: remove earlier CA certificates

TRANSITIONING NETWORK ENTITIES ASSOCIATED WITH A VIRTUAL CLOUD NETWORK THROUGH A SERIES OF PHASES OF A CERTIFICATE BUNDLE DISTRIBUTION PROCESS

INCORPORATION BY REFERENCE; DISCLAIMER

The following application is hereby incorporated by reference: application No. 63/467,662 filed on May 19, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to computer networks, such as virtual cloud networks. In particular, the present disclosure relates to distributing certificate bundles, that include new certificate authority (CA) certificates, to network entities associated with a computer network, such as a virtual cloud network.

BACKGROUND

A computer network, such as a virtual cloud network, includes network entities that communicate with one another. Communications between network entities may be performed in accordance with a security protocol whereby network entities authenticate one another by presenting a digital certificate. A digital certificate may be issued to a network entity by a CA. The digital certificate may include a digital signature of the CA that can be validated by other network entities using a public key of the CA that is made available to other network entities. When a network entity presents a valid digital certificate to another network entity, the other network entity can trust that it is communicating with the network entity, as opposed to some unknown entity, based on a trust relationship with the CA that issued the digital certificate. The CA certificates may be replaced with new CA certificates from time to time. Additionally, the new digital certificates may be issued to the network entities from time to time.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 is a flowchart that illustrates an example certificate bundle distribution process for distributing a new set of CA certificates to a plurality of network entities associated with a virtual cloud network in accordance with one or more embodiments;

DETAILED DESCRIPTION

Figure 1:
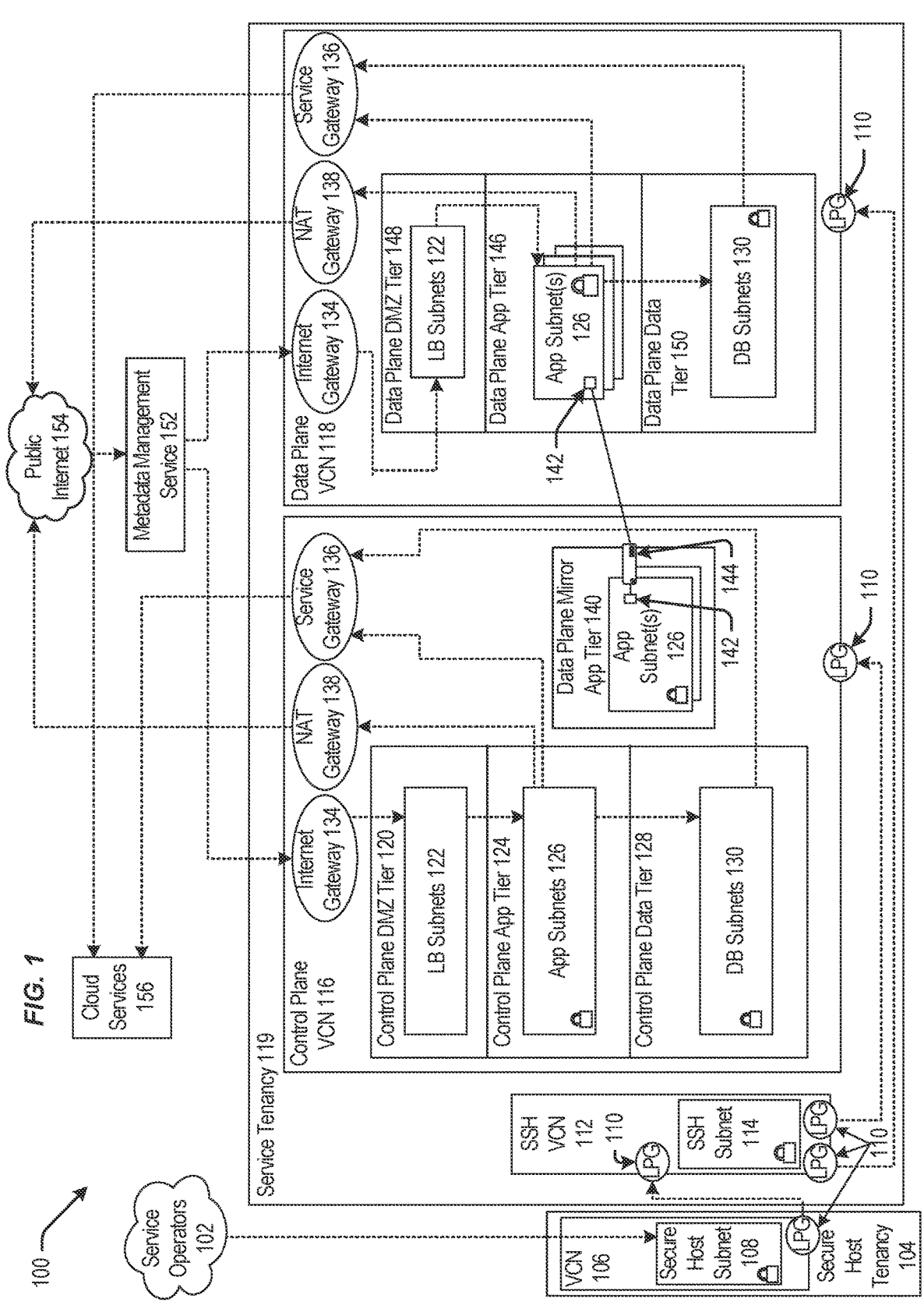
FIGS. 1-4 are block diagrams illustrating patterns for implementing a cloud infrastructure as a service system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CLOUD COMPUTING TECHNOLOGY
3. COMPUTER SYSTEM
4. ARCHITECTURAL OVERVIEW
5. EXAMPLE CERTIFICATE BUNDLE DISTRIBUTION PROCESS
6. TRANSITIONING NETWORK ENTITIES THROUGH A CERTIFICATE BUNDLE DISTRIBUTION PROCESS
7. AUTHENTICATING NETWORK ENTITIES
8. VALIDATING NETWORK ENTITY CERTIFICATE CHAINS
9. MISCELLANEOUS; EXTENSIONS

1. General Overview

One or more embodiments concurrently transition a set of network entities through phases in a certificate bundle distribution process based on aggregate metrics that correspond to a progress of the set of network entities in a current phase. For a particular phase of the process, a system obtains individual entity information for each particular network entity. Based on the individual entity information, the system computes an aggregate metric that indicates an aggregate progress of the plurality of network entities in relation to the particular phase of the process. The system conditions the transition of the plurality of network entities to the next phase of the process upon determining, based on the aggregate metric, that one or more transition criteria are satisfied. The one or more transition criteria for a particular phase in the certificate bundle distribution process may be associated with a milestone that, when met, assures that there will be no downtime associated with distributing the certificate bundle to the plurality of network entities. As a result, downtime is avoided by conditioning transitions between phases on the one or more transition criteria.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
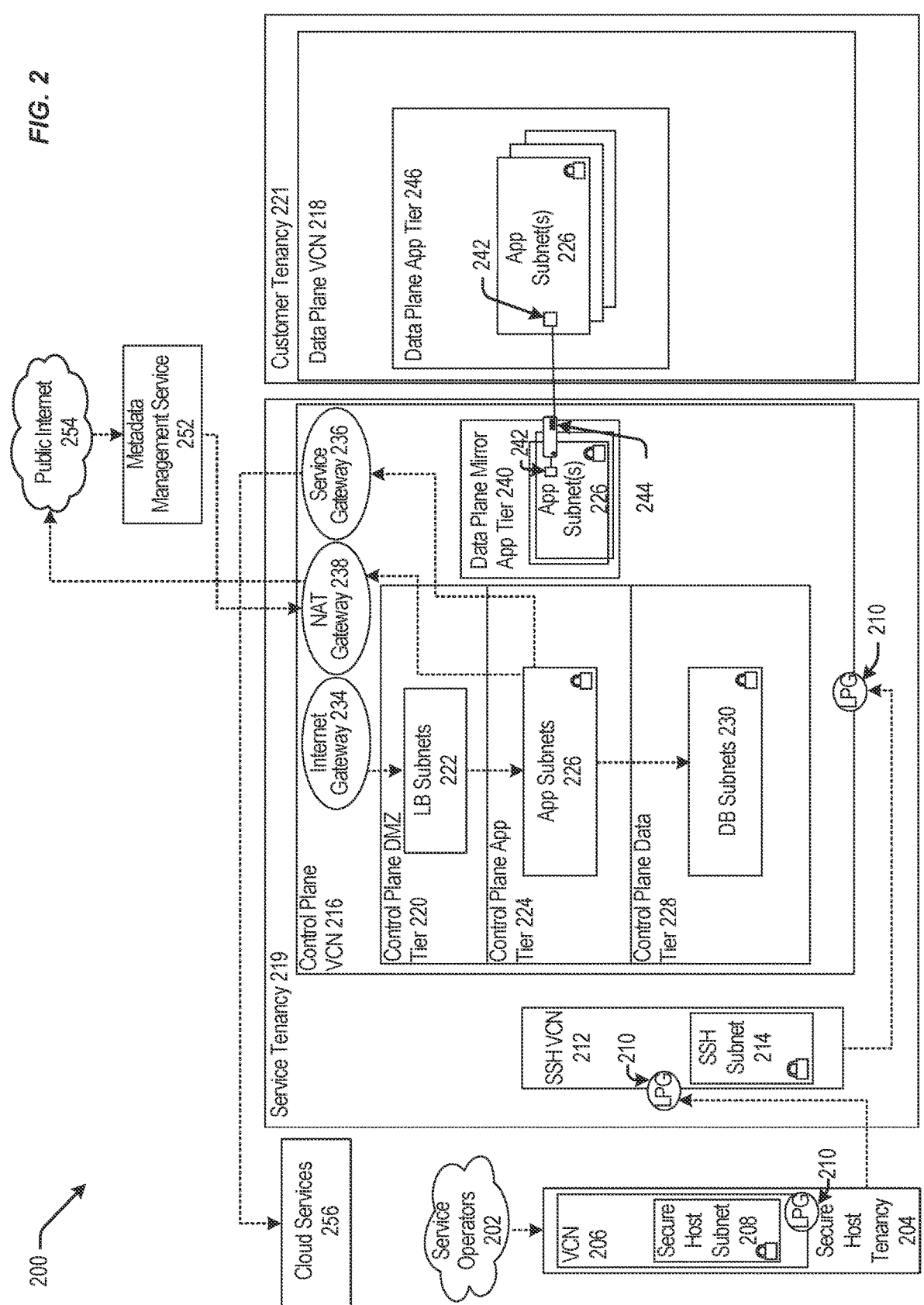

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
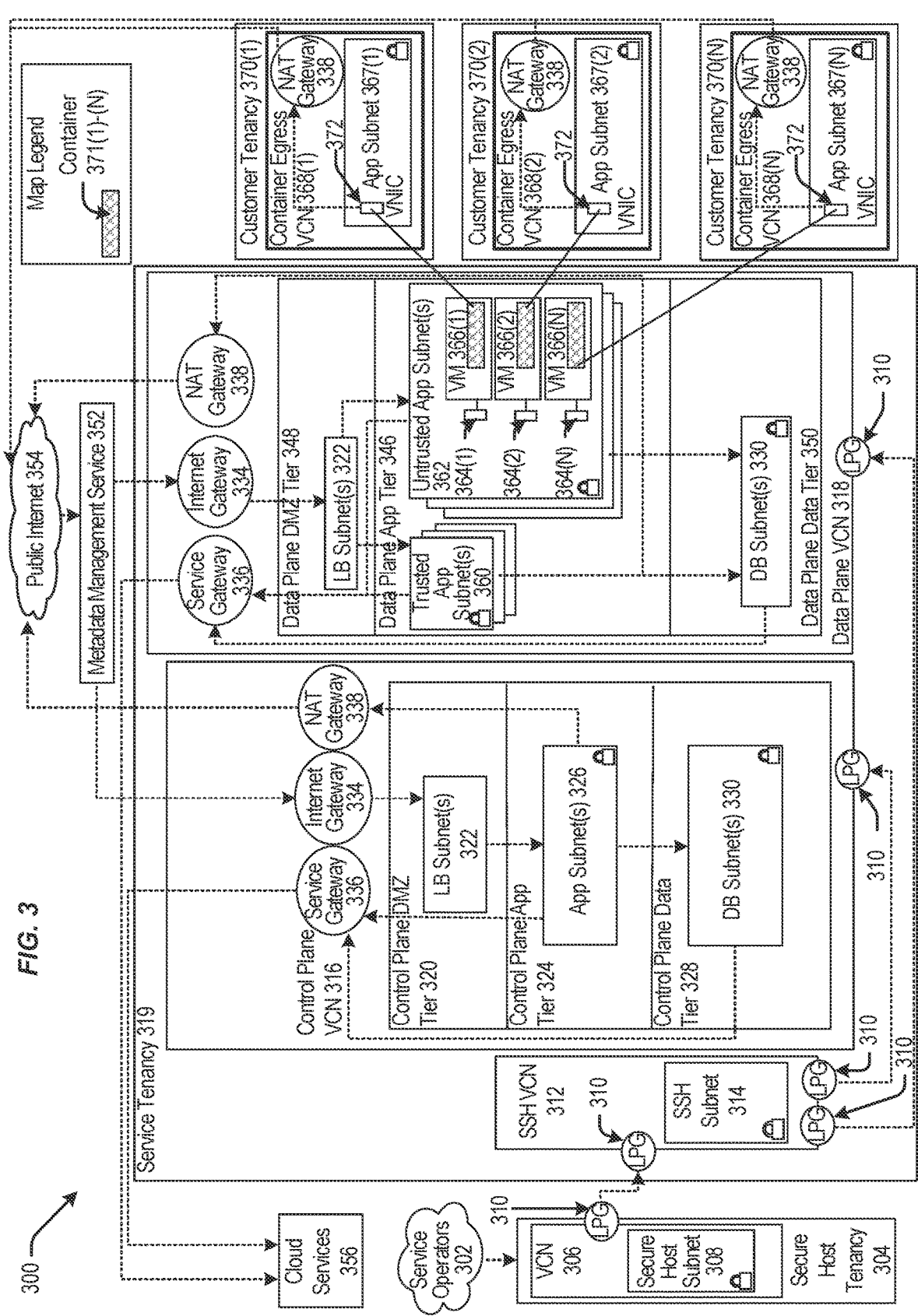

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
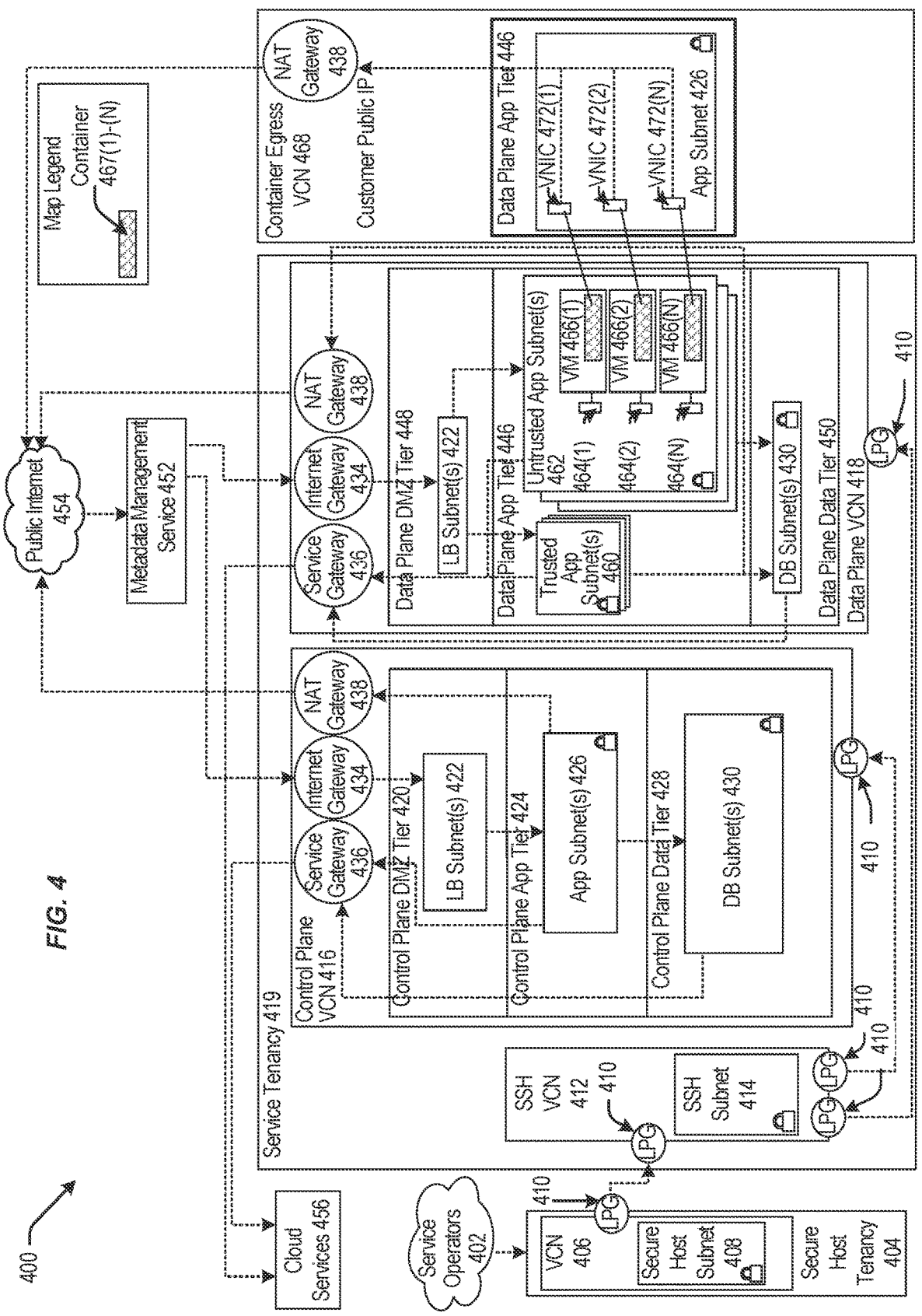

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
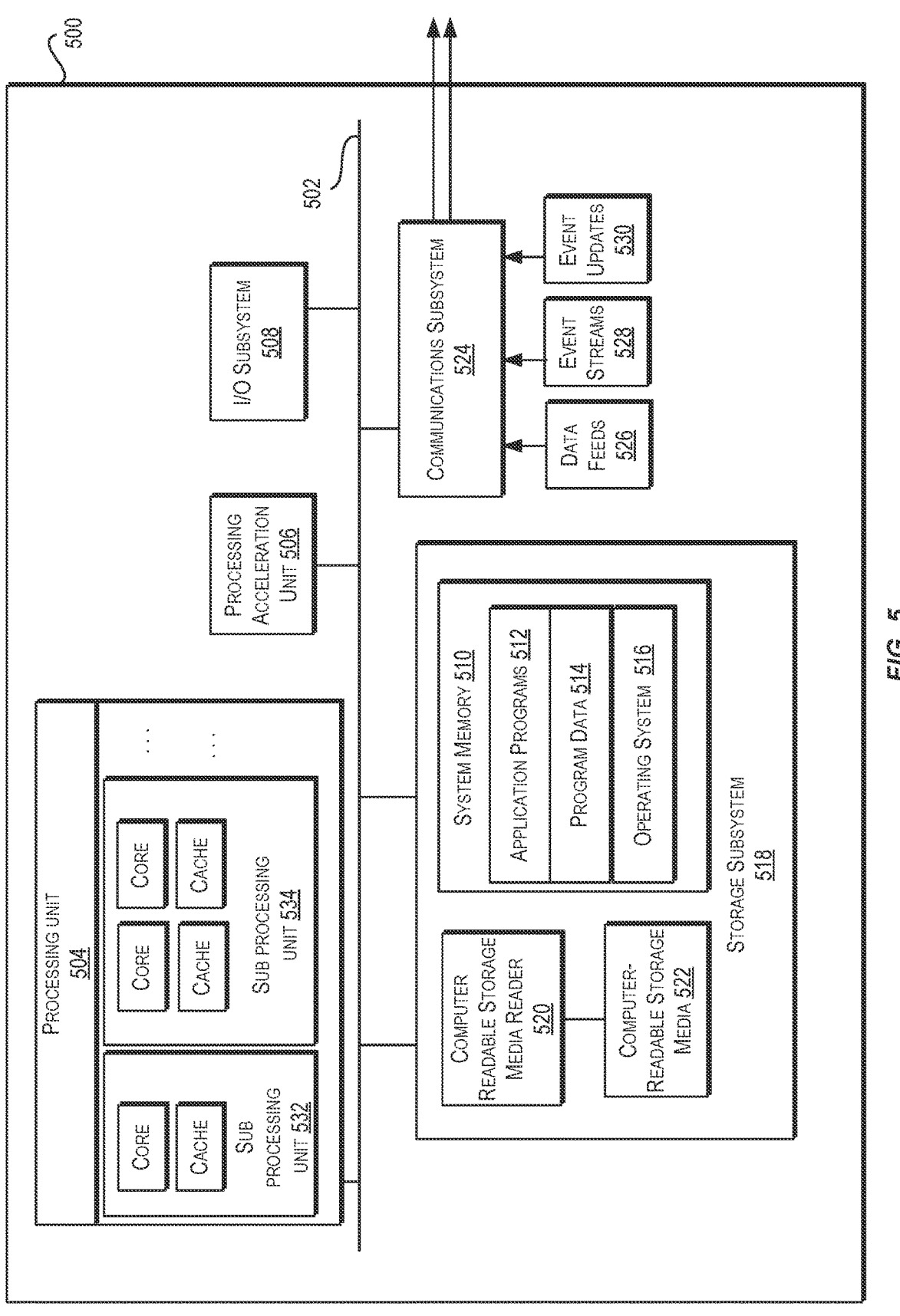
FIG. 5 is a hardware system in accordance with one or more embodiments.

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/ or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. Architectural Overview

Figure 6A:
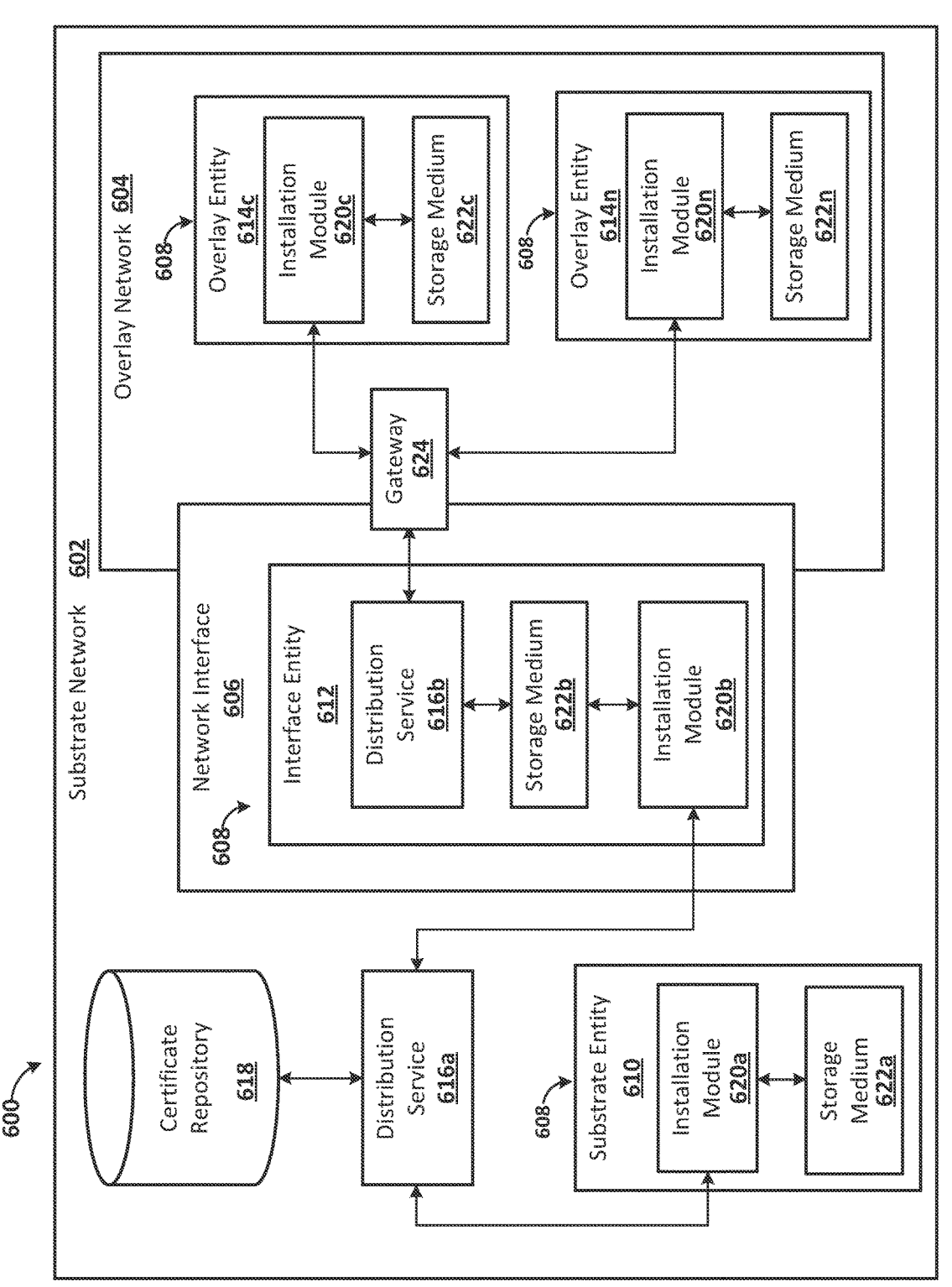
FIGS. 6A and 6B illustrate features of an example virtual cloud network in accordance with one or more embodiments.
Figure 6B:
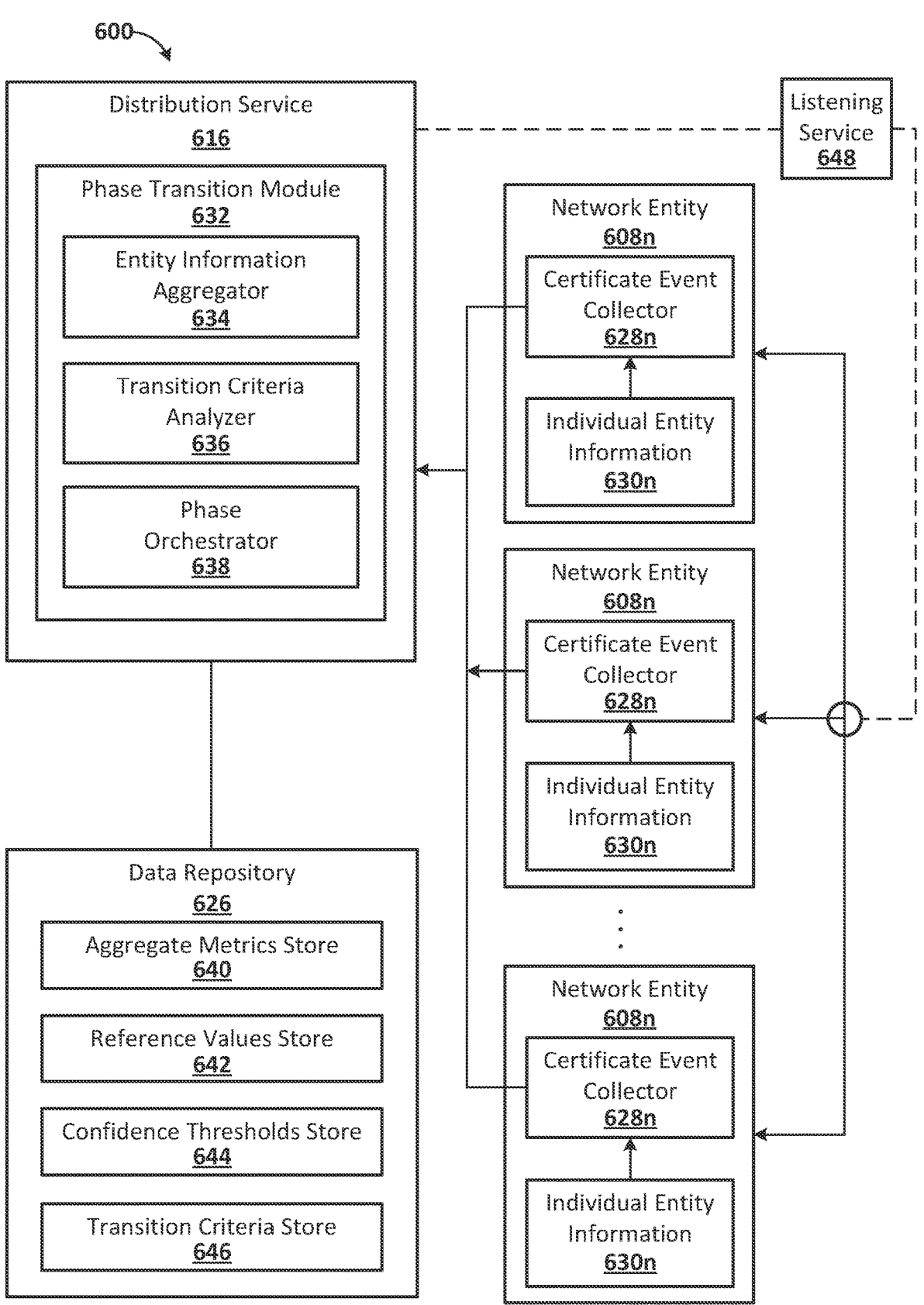

FIGS. 6A and 6B illustrate one example of a system 600 that includes a virtual cloud network in accordance with one or more embodiments. The system 600 described with reference to FIGS. 6A and 6B may perform operations associated with a process for transitioning, such as concurrently transitioning, a plurality of network entities associated with the virtual cloud network through the series of phases of the certificate bundle distribution process. The operation may be executed in connection with distributing a new set of one or more CA certificates to the plurality of network entities for use in a certificate authentication process.

As illustrated in FIG. 6A, the system 600 may include a substrate network 602, and overlay network 604, and a network interface 606 that provides communication between the substrate network 602 and the overlay network 604. The system may include a plurality of network entities 608 located throughout the virtual cloud network. A network entity 608 may reside on the substrate network 602, the overlay network 604, or the network interface 606. A network entity 608 may be implemented in hardware and/or software in association with the virtual cloud network, such as a node, a host, an agent, a service, a component, an endpoint, or other element. The plurality of network entities 608 may include one or more substrate entities 610, one or more interface entities 612, and/or one or more overlay entities 614.

As used herein, the term "substrate entity" refers to a network entity 608 implemented in a substrate network 602. As used herein, the term "substrate network" refers to a physical network infrastructure. The substrate network generally provides a foundation of a virtual cloud network. The substrate network 602 may include physical network devices, such as routers, switches, network links, and other networking components. The substrate network 602 may generally provide the basic connectivity and transport capabilities necessary for data transmission within and between data centers.

The one or more substate entities 610 may include substrate hosts, routers, firewall appliances, load balancers, storage devices, and/or substrate services. A substrate host may include an endpoint within the substrate network 602, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity 610 may include a combination of hardware and software. In one example, the one or more substrate entities 610 may include one or more substrate hosts, and/or one or more substrate services. In one example, a substrate host may include a bare metal host. In one example, a substrate service may include a firmware service. The substrate entities 610 may communicate with one another, and/or with other network entities 608, using logical network addresses assigned within the overlay network.

As used herein, the term "network interface" refers to a communication interface between a substrate network and an overlay network, such as a network interface card, a smartNIC, or the like. A network interface 606 may include one or more interface entities 612, such as a node on the network interface 606, or an interface service executing or executable on the network interface 606. A node on the network interface 606 may include a programmable hardware component, a memory component, or a gateway component. In one example, a network interface 606 may include a network interface card, such as a smartNIC. Additionally, or in the alternative, a network interface 606 may include a node or an endpoint on a network interface card or smartNIC.

A gateway component may provide connectivity between the substrate network 602 and the network interface 606, and/or between the network interface 606 and the overlay network 604. For example, a gateway component may enable communication between overlay entities 614 and substrate entities 610. Additionally, or in the alternative, a gateway component may provide connectivity between the overlay network 604 and external networks, such as the internet or other networks outside the overlay network. For example, an overlay gateway may enable communication between overlay entities 614 and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity 608 implemented on an overlay network 604. The overlay network 604 may include a plurality of overlay entities 614. The plurality of overlay entities 614 may include overlay hosts, overlay services, subnets, overlay controllers, and/or overlay clients. In one example, the overlay network 604 may include a plurality of overlay entities 614, such as overlay entity 614*c* and overlay entity 614*n*. In one example, an overlay entity 614 may include an overlay host. Additionally, or in the alternative, an overlay entity 614 may include an overlay service. The plurality of overlay entities 614 may communicate with one another using logical network addresses assigned within the overlay network 604.

An overlay host may include an endpoint within the overlay network 604, such as a virtual machine, a container, or a physical server. An overlay service may include a service executing or executable on an overlay entity. An overlay service may include a client-specific service, such as a service installed by a client. Additionally, or in the alternative, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

Referring further to FIG. 6A, the system 600 may include at least one distribution service 616 and at least one certificate repository 618. A distribution service 616 may be configured to transition, such as concurrently transition, a plurality of network entities through a series of phases of a certificate bundle distribution process for distributing a new set of one or more CA certificates to the plurality of network entities for use in a certificate authentication process. The certificate bundle distribution process may include distributing a certificate bundle that includes the new set of one or more CA certificates to the plurality of network entities 608. The certificate bundles may be housed in a certificate repository 618 accessible by the distribution service 616. The distribution service 616 may retrieve a certificate bundle from the certificate repository 618 and send the certificate bundle to one or more of the network entities 608. The certificate bundle distribution process may further include activating the CA certificates in the updated certificate bundle, distributing an updated entity certificate to each of the plurality of network entities, and/or removing earlier CA certificates (e.g., that were previously distributed to the plurality of network entities and/or that are replaced with a new CA certificate).

The certificate repository 618 may include a storage medium on the substrate network 602 or other physical hardware associated with the virtual cloud network. The certificate repository 618 may include any type of storage unit and/or device (e.g., a file system, database, collection of tables, or any other storage mechanism) for storing data. Further, the certificate repository 618 may include multiple different storage units and/or devices. The multiple different storage units and/or devices may or may not be of the same type or located at the same physical site. Further, the certificate repository 618 may be implemented or executed on the same computing system as a distribution service 616 and/or the network entities 608. Additionally, or in the alternative, a certificate repository 618 may be implemented or executed on a computing system separate from a distribution service 616 and/or the network entities 608. The certificate repository 618 may be communicatively coupled to a distribution service 616 via a direct connection or via a network.

In one example, a first distribution service 616*a* may be implemented on the substrate network 602. A distribution service 616 implemented on the substrate network 602 may be communicatively coupled with one or more substrate entities 610 on the substrate network 602. Additionally, or in the alternative, a distribution service 616 implemented on the substrate network 602 may be communicatively coupled with the network interface 606, such as with one or more interface entities 612 on the network interface 606. For example, the first distribution service 616a may obtain certificate bundles from the certificate repository 618 and distribute the certificate bundles to one or more substrate entities 610 on the substrate network 602 and/or to one or more interface entities 612 on the network interface 606.

In one example, a second distribution service 616b may be implemented on the network interface 606. A distribution service 616 implemented on the network interface 606 may be communicatively coupled with the overlay network 604 and/or the substrate network 602. For example, the second distribution service 616b implemented on the network interface 606 may be communicatively coupled with one or more overlay entities 614 on the overlay network 604. The second distribution service 616b may distribute certificate bundles to one or more overlay entities 614 on the overlay network 604. In one example, the second distribution service 616b may obtain certificate bundles from a storage medium associated with the network interface 606, such as from a storage medium associated with an interface entity 612 on the network interface 606. For example, the second distribution service 616b may distribute a certificate bundle that has been installed in the storage medium associated with the network interface 606 and/or the interface entity 612. In one example, the first distribution service 616a may distribute a certificate bundle to an interface entity 612 on the network interface 606, and the second distribution service 616b may distribute the certificate bundle to one or more overlay entities 614 on the overlay network 604 after the certificate bundle has been installed in the storage medium associated with the interface entity 612.

As shown in FIG. 6A, each network entity 608 may include an installation module 620 and a storage medium 622. The installation module 620 associated with a network entity 608 may receive certificate bundles from the distribution service 616 and install the certificate bundle in the storage medium 622 associated with the network entity 608. The distribution service 616 may distribute a certificate bundle to the installation module 620 in accordance with a respective phase of a certificate bundle distribution process. For example, the distribution service may transmit a certificate bundle each installation module 620 of the plurality of network entities 608 to which the certificate bundle is distributed in accordance with the certificate bundle distribution process.

In one example, the distribution service 616 may send certificate bundles to the overlay entities 614 by way of the gateway 624. In one example, the gateway 624 may be a metadata interface configured for exchanging metadata between the network interface 606 and the overlay entities 614. In one example, the gateway 624 may be utilized between the network interface 606 and each of the overlay entities 614. Additionally, or in the alternative, the network interface 606 may include a set of gateways 624, with each gateway 624 corresponding to a respective overlay entity 614.

Referring now to FIG. 6B, the system 600 is further described. As shown in FIG. 6B, a distribution service 616 may be communicatively coupled or couplable with a plurality of network entities 608. The system 600 may further include a data repository 626 communicatively coupled or couplable with the distribution service 616. Further, as shown in FIG. 6B, each network entity 608 may include a certificate event collector 628 that collects individual entity information 630 and transmits the individual entity information 630 to the distribution service 616. The term "individual entity information" refers to information associated with a progress of a particular network entity 608 in relation to one or more phases of a certificate distribution process. The individual entity information 630 may include information stored by the particular network entity 608, such as in the storage medium 622 associated with the particular network entity 608. Additionally, or in the alternative, the individual entity information 630 may include information transmitted to and/or from the particular network entity 608.

The distribution service 616 may obtain individual entity information 630 from each particular network entity of the plurality of network entities. The individual entity information 630 may include one or more distribution indicators that indicate a status of the particular network entity with respect to one or more phases of the certificate bundle distribution process. A distribution indicator may be indicative of a particular phase of the distribution process having been completed with respect to the particular network entity.

In one example, the one or more distribution indicators may respectively include one or more hash values, such as one or more cryptographic hash values, that indicate a status of the particular network entity with respect to one or more phases of the certificate bundle distribution process. The one or more hash values may respectively represent at least one of: a certificate bundle, a CA certificate, or an entity certificate. For example, the one or more hash values may represent a new certificate bundle that includes a new set of one or more CA certificates distributed to the particular network entity 608. Additionally, or in the alternative, the one or more hash values may represent at least one of the one or more CA certificates in the new certificate bundle distributed to the particular network entity 608. Additionally, or in the alternative, the one or more hash values may represent a new entity certificate having been issued to the particular network entity 608 based on at least one of the one or more CA certificates in the new certificate bundle distributed to the particular network entity 608.

In one example, the one or more distribution indicators may respectively include time data that indicates a status of the particular network entity with respect to one or more phases of the certificate bundle distribution process. For example, the one or more distribution indicators may include a bundle-load time indicative of a timestamp for a certificate bundle being loaded onto a storage medium 622 associated with the particular network entity 608. Additionally, or in the alternative, the one or more distribution indicators may include a restart time indicative of a timestamp for the particular network entity 608 performing a restart process. The restart process may be performed after the installation module 620 having loaded a new certificate bundle onto the storage medium 622.

Referring further to FIG. 6B, the distribution service 616 may include a phase transition module 632 configured to execute operations associated with transitioning a plurality of network entities through a series of phases of a certificate bundle distribution process. One or more operations of the phase transition module 632 may be associated with distributing a new set of one or more CA certificates to the plurality of network entities for use in a certificate authentication process. The phase transition module 632 may include an entity information aggregator 634, a transition criteria analyzer 636, and a phase orchestrator 638.

The entity information aggregator 634 may aggregate the individual entity information obtained from the plurality of network entities 608. Additionally, based on the individual entity information 630 for each particular network entity 608, the entity information aggregator 634 may compute one or more aggregate metrics indicative of an aggregate progress of the plurality of network entities 608 in relation to a particular phase of the distribution process. The aggregate metrics may be stored in the data repository 626, such as in an aggregate metrics store 640. In one example, the entity information aggregator 634 may compute an aggregate metric by comparing distribution indicators corresponding to the particular network entities to reference values. The reference values may be stored in the data repository, such as in a reference value store 642.

The transition criteria analyzer 636 may compare the one or more aggregate metrics computed by the entity information aggregator 634 to one or more transition criteria. Additionally, the transition criteria analyzer 636 may determine, based on an aggregate metric, that one or more transition criteria are satisfied for transitioning, such as concurrently transitioning, the plurality of network entities 608 from one phase to the next phase of the certificate bundle distribution process. The one or more transition criteria may be stored in the data repository 626, such as in a transition criteria store 644. In one example, an aggregate metric computed by the entity information aggregator 636 may include a confidence measurement indicative of having satisfied the one or more transition criteria associated with the particular phase of the certificate bundle distribution process. In one example, the transition criteria analyzer 636 may determine that the confidence measurement meets a confidence threshold. One or more confidence thresholds corresponding to respective transition criteria may be stored in the data repository 626, such as in a confidence threshold store 646.

The phase orchestrator 638 may cause the distribution service 616 to execute operations associated with the respective phases of the certificate bundle distribution process. For example, the phase orchestrator 638 may cause the distribution service 616 to transition the plurality of network entities from one phase to the next phase of the certificate bundle distribution process in response to determining that the one or more transition criteria are satisfied for transitioning the plurality of network entities to the next phase. Additionally, or in the alternative, the phase orchestrator 638 may execute one or more operations in relation to each of the plurality of network entities 608 in accordance with a respective phase of the certificate bundle distribution process.

Referring further to FIG. 6B, the system 600 may include a listening service 648. The listening service may be configured to monitor messages transmitted by and/or between network entities 608. The listening service 648 may transmit at least a portion of a monitored message to the distribution service 616. For example, the listening service 648 may monitor messages transmitted from one network entity to another network entity in association with a certificate authentication process. Additionally, the listening service may transmit copies of the messages between network entities to the distribution service 616. The certificate authentication process may include a TLS handshake process, and a message transmitted from the listening service 648 to the distribution service 616 may include TLS handshake data. For example, the TLS handshake data may include an entity certificate transmitted by a network entity for authentication as part of the TLS handshake process. The distribution service 616 may utilize the messages from the listening service 648 to identify which entity certificates are being utilized by the network entities in the certificate authentication process. For example, the distribution service 616 may determine whether the network entities are using new entity certificates issued by a CA based on at least one new CA certificate included in a new certificate bundle.

A distribution service 616 may distribute certificate bundles to network entities 608 associated with a particular region or to network entities 608 of a plurality of different regions within a realm. Additionally, or in the alternative, a distribution service 616 may distribute certificate bundles to network entities 608 associated with a particular virtual cloud network, or to network entities 608 of a plurality of different virtual cloud networks. Additionally, or in the alternative, a distribution service 616 may distribute certificate bundles to network entities 608 associated with a particular overlay network 604, or to network entities 608 of a plurality of different overlay networks 604. In one example, the system 600 may include a plurality of regions associated with a realm. In one example, the system 600 may include a plurality of realms that respectively include a plurality of regions. As used herein, the term "region" refers to a set of one or more interconnected data centers upon which a virtual cloud network is deployed. In one example, a region may correspond to a physical geographic area. In one example, a region may correspond to multiple physical geographic areas and/or a portion of a physical geographic area. As used herein, the term "realm" refers to a distinct deployment of an IaaS system infrastructure. In one example, regions within a realm may communicate with one another. In one example, regions from different realms may be unable to communicate with one another.

In one or more embodiments, the system 600 may include more or fewer components than the components illustrated in FIGS. 6A and 6B. The components illustrated in FIGS. 6A and 6B may be local to or remote from each other. The components illustrated in FIGS. 6A and 6B may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. Example Certificate Bundle Distribution Process

Referring now to FIG. 7, operations pertaining to an example certificate bundle distribution process are further described. The operations 700 described with reference to FIG. 7 may be associated with distributing a new set of one or more CA certificates to a plurality of network entities for use in a certificate authentication process. The CA certificates may include root CA certificates and/or intermediate CA certificates. The CA certificates may be housed in a certificate bundle. One or more operations 700 illustrated in FIG. 7 may be modified, rearranged, or omitted all together. Accordingly, the particular sequence of operations 700 illustrated in FIG. 7 should not be construed as limiting the scope of one or more embodiments. As shown in FIG. 7, operations 700 pertaining to the certificate bundle distribution process may include a series or sequence of phases. In one example, as shown, the operations 700 may include a series or sequence of phases, such as four (4) phases. In another example, the series or sequence of phases may include more or less than four (4) phases, for example, including all or a portion of the phases shown in FIG. 7.

In one example, the operations 700 may include, at block 702, distributing a new certificate bundle including a new set of one or more CA certificates to a set of network entities associated with a virtual cloud network. The new set of one or more CA certificates may include at least one new CA certificate. At block 704, the operations 700 may include determining whether the new certificate bundle has been successfully distributed. When the new certificate bundle has been successfully distributed, the operations 700 may proceed to a next phase in the distribution process. The operation at block 702 and/or 704 may represent Phase 1 of a certificate bundle distribution process.

In one example, the operations 700 may include, at block 706, activating the CA certificates in the new certificate bundle. The operation at block 706 may represent Phase 2 of a certificate bundle distribution process.

In one example, the operations 700 may include, at block 708, distributing new entity certificates to the set of network entities. Additionally, or in the alternative, the operations 700 may include distributing new intermediate CA certificates, for example, corresponding to the new entity certificates. At block 710, the operations 700 may include determining whether the new entity certificates have been successfully distributed. Additionally, or in the alternative, the operations may include determining whether the new intermediate CA certificates have been successfully distributed. When the new entity certificates (and/or the new intermediate CA certificates) have been successfully distributed, the operations 700 may proceed to a next phase in the distribution process. The operation at block 708 and 710 may represent Phase 3 of a certificate bundle distribution process.

In one example, the operations 700 may include, at block 712, removing earlier CA certificates that were distributed prior to the new CA certificates. For example, the earlier CA certificates may include CA certificates that are being superseded by the new CA certificates. Removing an earlier CA certificate with respect to a particular network entity may include deleting the earlier CA certificate from a storage medium associated with the particular network entity. For example, the operations 700 may include transmitting, to the particular network entity, an instruction to delete the earlier CA certificate from the storage medium. Rpensive to receiving the instruction, the particular network entity may delete the earlier CA certificate from the storage medium.

Additionally, or in the alternative, removing an earlier CA certificate with respect to a network entity may include replacing a first new certificate bundle with a second certificate bundle, in which the first new certificate bundle includes the new CA certificates and the earlier CA certificates and the second new certificate bundle reflects the earlier CA certificates having been removed or deleted from the first certificate bundle. The second certificate bundle may be distributed to the particular network entity and installed in the storage medium associated with the particular network entity, and the first new certificate bundle may be deleted from the storage medium. The operation at block 712 may represent Phase 4 of a certificate bundle distribution process.

6. Transitioning Network Entities Through a Certificate Bundle Distribution Process Referring now to FIG. 8, operations 800 pertaining to transitioning, such as concurrently transitioning, a plurality of network entities through a series of phases of a certificate bundle distribution process are further described. The operations 800 described with reference to FIG. 8 may represent at least a portion of a process for transitioning the plurality of network entities associated with a virtual cloud network through the series of phases of the certificate bundle distribution process. The operation 800 may be executed in connection with distributing a new set of one or more CA certificates to the plurality of network entities for use in a certificate authentication process. One or more operations 800 described with reference to in FIG. 8 may be modified, rearranged, or omitted all together. Accordingly, the particular sequence of operations 800 described with reference to FIG. 8 should not be construed as limiting the scope of one or more embodiments.

The virtual cloud network may include a substrate network, an overlay network, and a network interface that provides a communication pathway between the substrate network and the overlay network. The plurality of network entities may include at least one of: a substrate entity located on the substrate network, an overlay entity located on the overlay network, or an interface entity located on the network interface. Additionally, or in the alternative, the plurality of network entities may include at least one host located on the substrate network or on the overlay network, or at least one service executing or executable on a substrate host or an overlay host. The new set of one or more CA certificates may include one or more new CA certificates, and one or more earlier CA certificates.

Figure 8:
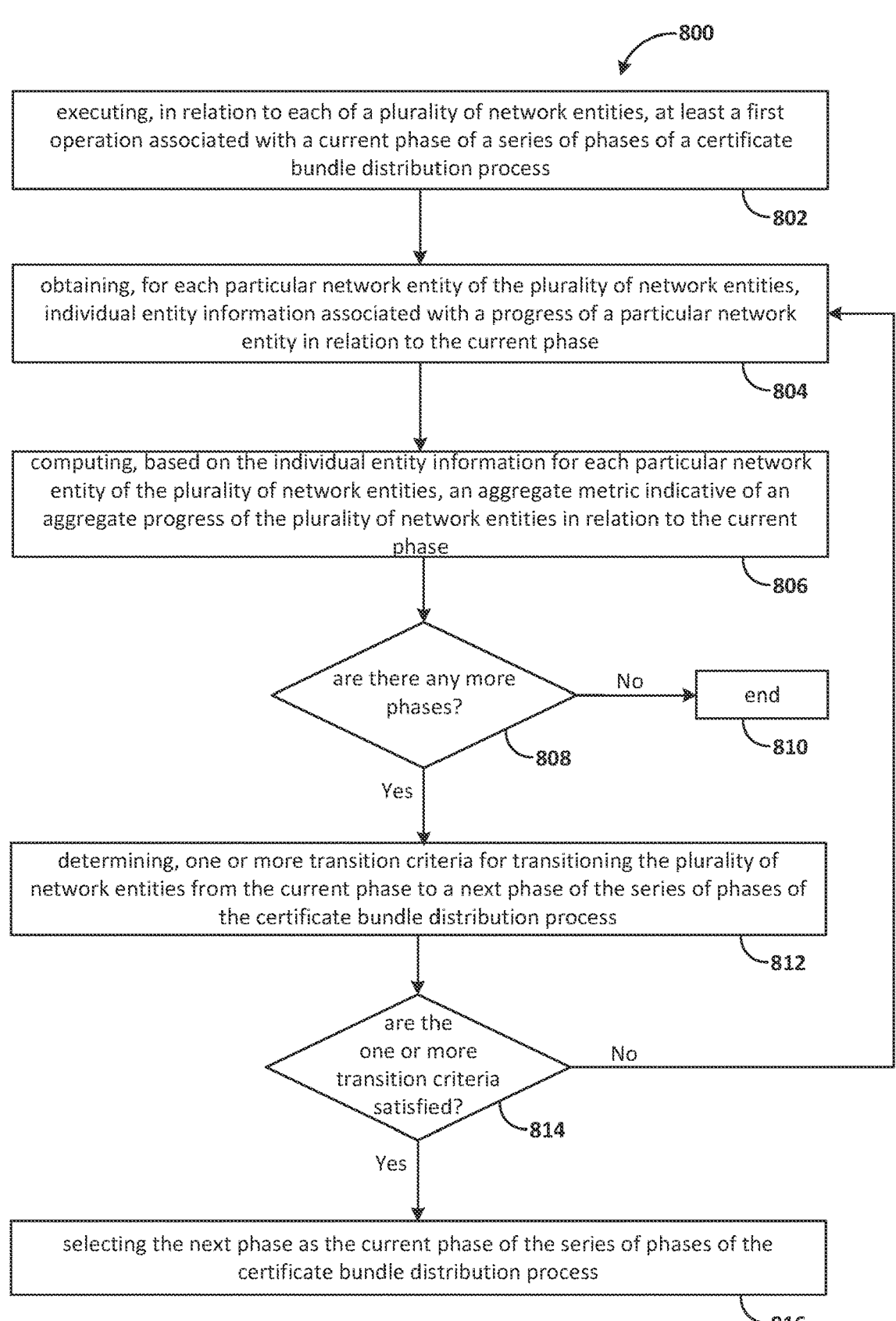
FIG. 8 is a flowchart that illustrates example operations pertaining to transitioning a plurality of network entities associated with a virtual cloud network through a series of phases of a certificate bundle distribution process in accordance with one or more embodiments.

As shown in FIG. 8, the operations 800 may include, at block 802, executing, in relation to each of a plurality of network entities associated with a virtual cloud network, at least a first operation associated with a current phase of a series of phases of a certificate bundle distribution process. A first phase of the certificate bundle distribution process may be initially selected as or may correspond to the current phase. The first operation may include an operation described with reference to FIG. 7. The first operation may be executed by the distribution service, such as by a phase orchestrator of the distribution service, as described with reference to FIG. 6B.

At block 804, the operations 800 may include obtaining, for each particular network entity of the plurality of network entities, individual entity information associated with a progress of a particular network entity in relation to the current phase. The individual entity information may be obtained by a distribution service, such as by a phase transition module of a distribution service, as described with reference to FIG. 6B. In one example, obtaining the individual entity information may include receiving the individual entity information from a certificate event collector hosted by each particular network entity.

At block 806, the operations 800 may include computing, based on the individual entity information for each particular network entity of the plurality of network entities, an aggregate metric indicative of an aggregate progress of the plurality of network entities in relation to the current phase. The aggregate metric may be computed by the distribution service, such as by the phase transition module of the distribution service, as described with reference to FIG. 6B.

At block 808, the operations 800 may include determining whether there are any more phases in the series of phases of the certificate bundle distribution process. If there are no more phases, the operations 800 may conclude at block 810. If there is at least one additional phase of the certificate distribution process, the operations 800 may proceed to block 812.

At block 812, the operations may include determining one or more transition criteria for transitioning the plurality of network entities from the current phase to a next phase of the series of phases of the certificate bundle distribution process. The one or more transition criteria may be determined by the distribution service, such as by a transition criteria analyzer of the distribution service, as described with reference to FIG. 6B.

At block 814, the operations 800 may include determining, based on the aggregate metric, whether the one or more transition criteria are satisfied for transitioning the plurality of network entities from the first phase to a second phase of the series of phases of the certificate bundle distribution process. The determination as to whether the one or more transition criteria are satisfied may be performed by the distribution service, such as by the transition criteria analyzer of the distribution service, as described with reference to FIG. 6B. If the one or more transition criteria are unsatisfied, the operations 800 may return to block 804, for example, to obtain additional individual entity information associated with the progress of one or more of the particular network entities in relation to the first phase. Additionally, or in the alternative, the operations 800 may return to block 802, for example, to further execute at least the first operation associated with the first phase of the series of phases of the certificate bundle distribution process. When the one or more transition criteria are satisfied, the operations 800 may proceed to block 816. At block 816, responsive to determining that the one or more transition criteria are satisfied, the operations 800 may include selecting the next phase as the current phase of the certificate bundle distribution process.

In one example, the aggregate metric computed at block 806 may include a confidence measurement, and the one or more transition criteria determined based on the aggregate metric at block 812 may include a confidence threshold. The determination as to whether the one or more transition criteria are satisfied at block 814, may include determining whether the confidence measurement meets the confidence threshold. If the confidence measurement does not meet the confidence threshold, the operations 800 may return to block 802 or block 804. When the confidence measurement does not meet the confidence threshold, the operations 800 may proceed to block 816.

In one example, at block 812, the one or more transition criteria may be determined periodically. For a first determination of the one or more transition criteria, the one or more transition criteria may be satisfied at block 814 for a first number or a first proportion of the plurality of network entities. Additionally, or in the alternative, for a second determination of the one or more transition criteria, the one or more transition criteria may be satisfied at block 814 for a second number or a second proportion of the plurality of network entities.

In one example, the operations 800 may include incrementing a counter representing a number or a proportion of the plurality of network entities with respect to which the one or more transition criteria are satisfied. Additionally, or in the alternative, the one or more transition criteria may include the counter meeting a threshold. In one example, the operations 800 may include periodically determining a number or a portion of the plurality of network entities with respect to which the one or more transition criterial are satisfied, and incrementing the counter to reflect the aggregate number or proportion of the plurality of network entities with respect to which the one or more transition criteria are satisfied. At block 814, the counter may be compared to the threshold, and if the counter falls below the threshold, the operations 800 may return to block 804, and a next periodic determination may be performed. The periodic determinations may be performed until the counter meets the threshold, and the operations 800 may proceed to block 816 when the counter meets the threshold. In one example, the operations 800 may include displaying an alert indicating a number or a portion of the plurality of network entities with respect to which the aggregate metric is unsatisfied. The operations 800 may further include ceasing displaying the alert when the counter meets the threshold.

A. Transitioning to Next Phase of Distribution Process Based on Successful Installation of New Certificate Bundle.

Referring further to FIG. 8, in one example, the transition criteria for transitioning from the first phase to the second phase at block 812 may include an indication that at least a threshold portion of the network entities have successfully installed the new certificate bundle. For example, the successful installation of the new certificate bundle may be used as a transition criteria for the transition from Phase 1 to Phase 2 of the certificate bundle distribution process described with reference to FIG. 7. The first phase described with reference to FIG. 8 may be Phase 1 of the certificate bundle distribution process described with reference to FIG. 7. More particularly, the first phase at block 802 may include distributing, to each particular network entity of the plurality of network entities, a new certificate bundle that includes a new set of one or more CA certificates, for example, as described with reference to block 702 of FIG. 7. Additionally, or in the alternative, the second phase at block 816 may include activating the at least one new CA certificate, as described with reference to block 706 of FIG. 7. The transition criteria for transitioning from the first phase to the second phase (e.g., from Phase 1 to Phase 2) may include successful installation of the new certificate bundle by at least a threshold portion of the network entities. The successful installation of the new certificate bundle by at least the threshold portion of the network entities may serve as an indication that the certificate bundle has been successfully distributed, for example, at block 704 of the certificate bundle distribution process described with reference to FIG. 7.

In one example, the individual entity information obtained at block 804 for a particular network entity may include a distribution indicator indicative of the first phase having been completed with respect to the particular network entity. The distribution indicator may include an indication of whether the new certificate bundle is installed on a storage medium associated with the particular network entity. In one example, computing the aggregate metric at block 806 may include determining a number or a proportion of the plurality of network entities with respect to which the new certificate bundle is installed on the storage medium associated with the particular network entity. Further, the one or more transition criteria determined at block 812 may include the aggregate metric meeting a threshold. More particularly, the one or more transition criteria determined at block 812 may include a threshold number or proportion of the plurality of network entities with respect to which the new certificate bundle is installed on the storage medium associated with the particular network entity. Further, determining whether the one or more transition criteria are satisfied at block 814 may include determining whether the aggregate metric meets the threshold. More particularly, the operations 800 at block 814 may include comparing (a) the number or proportion of the plurality of network entities with respect to which the new certificate bundle is installed on the storage medium associated with the particular network entity to (b) the threshold number or proportion of the plurality of network entities with respect to which the new certificate bundle is installed on the storage medium associated with the particular network entity.

In one example, the distribution indicator for a particular network entity may include a hash value, such as a cryptographic hash value, representing a certificate bundle installed on the storage medium associated with the particular network entity. Additionally, or in the alternative, obtaining the individual entity information, at block 804, may include obtaining, for the particular network entity, the hash value representing the certificate bundle installed on the storage medium associated with the particular network entity.

With respect to the particular network entity, computing the aggregate metric at block 806 may include comparing the hash value to a reference hash value representing the new certificate bundle, and determining whether the new certificate bundle is installed on the storage medium associated with the particular network entity based on a match or a mismatch between the hash value and the reference hash value. More particularly, a match between the hash value and the reference hash value indicates that the certificate bundle represented by the hash value is the new certificate bundle. Further, the match may indicate that the new certificate bundle is installed on the storage medium associated with the particular network entity. A mismatch between the hash value and the reference hash value indicates that the certificate bundle represented by the hash value is not the new certificate bundle. Further, the mismatch may indicate that the new certificate bundle is not installed, or has yet to be installed, on the storage medium associated with the particular network entity.

In one example, the aggregate metric may include a number or a proportion of the plurality of network entities with respect to which the new certificate bundle is installed on the storage medium associated with the particular network entity, for example, as determined based on a match between the hash value and the reference hash value with respect to the particular network entity. In one example, the hash value representing the certificate bundle installed on the storage medium may be obtained periodically for at least some of the plurality of network entities until a threshold is met for the number or the proportion of the plurality of network entities with respect to which the new certificate bundle is installed on the storage medium associated with the particular network entity, for example, as determined based on a match between the hash value and the reference hash value with respect to the particular network entity.

For example, the operations 800 may include determining a mismatch between the hash value and the reference hash value with respect to a particular network entity, and determining that the aggregate metric fails to meet the threshold at least as a result of the mismatch. Further, the operations 800 may include obtaining, with respect to the particular network entity, a second instance of the hash value representing a second certificate bundle installed on the storage medium associated with the particular network entity, determining a match between the second hash value and the reference hash value, and determining that the aggregate metric meets the threshold at least as a result of the match.

In one example, the operations 800 may include generating an alert in an alert log responsive to determining, based on the mismatch between the hash value and the reference hash value with respect to a particular network entity, that the new certificate bundle has not been installed in the storage medium associated with the particular network entity. The alert may indicate, based on the mismatch between the first certificate bundle and the new certificate bundle, an unsuccessful distribution of the new certificate bundle to the particular network entity. Additionally, or in the alternative, the operations 800 may include initiating a restart process with respect to the particular network entity responsive to determining the mismatch between the hash value and the reference hash value. The restart process may include the particular network entity downloading, receiving, installing, loading, or accessing, the new certificate bundle.

B. Transitioning to Next Phase of Distribution Process Based on Successful Loading of New Certificate Bundle.

Referring further to FIG. 8, in one example, the transition criteria for transitioning from the first phase to the second phase at block 812 may include an indication that at least a threshold portion of the network entities have successfully loaded the new certificate bundle. For example, the successful loading of the new certificate bundle may be used as a transition criteria for the transition from Phase 1 to Phase 2 of the certificate bundle distribution process described with reference to FIG. 7. The first phase described with reference to FIG. 8 may be Phase 1 of the certificate bundle distribution process described with reference to FIG. 7. More particularly, the first phase at block 802 may include distributing, to each particular network entity of the plurality of network entities, a new certificate bundle that includes a new set of one or more CA certificates, for example, as described with reference to block 702 of FIG. 7. Additionally, or in the alternative, the second phase at block 816 may include activating the at least one new CA certificate, as described with reference to block 706 of FIG. 7. The transition criteria for transitioning from the first phase to the second phase (e.g., from Phase 1 to Phase 2) may include successful loading of the new certificate bundle by at least a threshold portion of the network entities. The successful loading of the new certificate bundle by at least the threshold portion of the network entities may serve as an indication that the certificate bundle has been successfully distributed, for example, at block 704 of the certificate bundle distribution process described with reference to FIG. 7.

In one example, the individual entity information obtained at block 804 for a particular network entity may include a distribution indicator indicative of the first phase having been completed with respect to the particular network entity. The distribution indicator may include an indication of whether the particular network entity has loaded the new certificate bundle. In one example, computing the aggregate metric at block 806 may include determining a number or a proportion of the plurality of network entities with respect to which the particular network entity has loaded the new certificate bundle.

Further, the one or more transition criteria determined at block 812 may include the aggregate metric meeting a threshold. More particularly, the one or more transition criteria determined at block 812 may include a threshold number or proportion of the plurality of network entities with respect to which the particular network entity has loaded the new certificate bundle. Further, determining whether the one or more transition criteria are satisfied at block 814 may include determining whether the aggregate metric meets the threshold. More particularly, the operations 800 at block 814 may include comparing (a) the number or proportion of the plurality of network entities with respect to which the particular network entity has loaded the new certificate bundle to (b) the threshold number or proportion of the plurality of network entities with respect to which the particular network entity has loaded the new certificate bundle.

In one example, the individual entity information for a particular network entity may include a first distribution indicator and a second distribution indicator. The first distribution indicator may include a bundle-load time indicative of a first timestamp for a first certificate bundle being loaded onto a storage medium associated with the particular network entity. The second distribution indicator may include a restart time indicative of a second timestamp for the particular network entity performing a restart process. At block 804, obtaining the individual entity information may include obtaining, for the particular network entity, the bundle-load time and the restart time. In one example, the particular network entity may be a host located on the virtual cloud network, and the restart process may include rebooting the host. In one example, the particular network entity may be a service executing on a host located on the virtual cloud network, and the restart process may include reloading the service.

With respect to the particular network entity, computing the aggregate metric at block 806 may include comparing the restart time to the bundle-load time, and determining whether the particular network entity has loaded the new certificate bundle based on whether the restart time is subsequent to the bundle-load time. More particularly, the restart time being subsequent to the bundle-load time indicates that the certificate bundle corresponding to the bundle load time is the new certificate bundle. Further, the restart time being subsequent to the bundle-load time may indicate that the new certificate bundle is loaded onto the storage medium associated with the particular network entity. Alternatively, the restart time being prior to the bundle-load time (or the bundle-load time being subsequent to the restart time) indicates that the certificate bundle corresponding to the bundle load time differs from, or is not, the new certificate bundle. Further, the bundle-load time being subsequent to the restart time may indicate that the new certificate bundle is not loaded, or has yet to be loaded, onto the storage medium associated with the particular network entity.

In one example, the aggregate metric may include a number or a proportion of the plurality of network entities with respect to which the particular network entity has loaded the new certificate bundle, for example, as determined based on the restart time being subsequent to the bundle-load time with respect to the particular network entity. In one example, the restart time and the bundle-load time may be obtained periodically for at least some of the plurality of network entities until a threshold is met for the number or the proportion of the plurality of network entities with respect to which the particular network entity has loaded the new certificate bundle, for example, as determined based on the restart time being subsequent to the bundle-load time with respect to the particular network entity.

For example, the operations 800 may include determining based on the bundle-load time being subsequent to the restart time, that the new certificate bundle has yet to be loaded onto the storage medium associated with the particular network entity. The operations 800 may further include determining that the aggregate metric fails to meet the threshold at least as a result of the bundle-load time being subsequent to the restart time with respect to the particular network entity. Further, the operations 800 may include obtaining a second instance of the bundle-load time and the restart time with respect to the particular network entity, determining that the second instance of the restart time is subsequent to the second instance of the bundle-load time with respect to the particular network entity, and determining that the aggregate metric meets the threshold at least as a result of the second instance of the restart time being subsequent to the second instance of the bundle-load time with respect to the particular network entity.

In one example, the operations 800 may include generating an alert in an alert log responsive to determining, based on the restart time being prior to the bundle-load time (or the bundle-load time being subsequent to the restart time) that the certificate bundle corresponding to the bundle load time differs from, or is not, the new certificate bundle. The alert may indicate, based on the restart time being prior to the bundle-load time (or the bundle-load time being subsequent to the restart time), an unsuccessful distribution of the new certificate bundle to the particular network entity. Additionally, or in the alternative, the operations 800 may include initiating a restart process with respect to the particular network entity responsive to determining that the restart time is prior to the bundle-load time with respect to the particular network entity. The restart process may include the particular network entity downloading, receiving, installing, loading, or accessing, the new certificate bundle.

C. Transitioning to Next Phase of Distribution Process Based on Successful Use of New Entity Certificates in a Certificate Authentication Process.

Referring further to FIG. 8, in one example, the transition criteria for transitioning from the first phase to the second phase at block 812 may include an indication that at least a threshold portion of the network entities have successfully used, in a certificate authentication process, a new entity certificate issued by a CA based on at least one new CA certificate included in the new certificate bundle. For example, the successful use of the new entity certificate may be utilized as a transition criteria for the transition from Phase 3 to Phase 4 of the certificate bundle distribution process described with reference to FIG. 7. The first phase described with reference to FIG. 8 may be Phase 3 of the certificate bundle distribution process described with reference to FIG. 7. More particularly, the first phase at block 802 may include distributing, to each particular network entity of the plurality of network entities, a new entity certificate having been issued to the particular network entity based on the at least one new CA certificate of the new set of one or more CA certificates, for example, as described with reference to block 708 of FIG. 7. Additionally, or in the alternative, the second phase at block 816 may include, for each particular network entity of the plurality of network entities, removing or deleting from a storage medium associated with the particular network entity, at least one earlier CA certificate, for example, as described with reference to block 712 of FIG. 7. Additionally, or in the alternative, the second phase at block 816 may include for each particular network entity of the plurality of network entities, removing, or deleting from the storage medium associated with the particular network entity, an earlier entity certificate having been issued to the particular network entity based on the at least one earlier CA certificate.

In one example, prior to removing or deleting the at least one earlier CA certificate, the new certificate bundle and/or the new set of one or more CA certificates may include the at least one new CA certificate and the at least one earlier CA certificate. After removing or deleting the at least one earlier CA certificate, the new certificate bundle and/or the new set of one or more CA certificates may include the at least one new CA certificate without the at least one earlier CA certificate. The transition criteria for transitioning from the first phase to the second phase (e.g., from Phase 3 to Phase 4) may include successful use of the new entity certificate by at least a threshold portion of the network entities. The successful use of the new entity certificates by at least the threshold portion of the network entities may serve as an indication that the new entity certificates have been successfully distributed, for example, at block 704 of the certificate bundle distribution process described with reference to FIG. 7.

In one example, the individual entity information obtained at block 804 for a particular network entity may include a distribution indicator indicative of the first phase having been completed with respect to the particular network entity. The distribution indicator may include an indication of whether the particular network entity has used the new entity certificate in a certificate authentication process between the particular network entity and an additional network entity. In one example, computing the aggregate metric at block 806 may include determining a number or a proportion of the plurality of network entities with respect to which the particular network entity has used the new entity certificate in the certificate authentication process.

Further, the one or more transition criteria determined at block 812 may include the aggregate metric meeting a threshold. More particularly, the one or more transition criteria determined at block 812 may include a threshold number or proportion of the plurality of network entities with respect to which the particular network entity has used the new entity certificate in the certificate authentication process. Further, determining whether the one or more transition criteria are satisfied at block 814 may include determining whether the aggregate metric meets the threshold. More particularly, the operations 800 at block 814 may include comparing (a) the number or proportion of the plurality of network entities with respect to which the particular network entity has used the new entity certificate in the certificate authentication process to (b) the threshold number or proportion of the plurality of network entities with respect to which the particular network entity has used the new entity certificate in the certificate authentication process.

In one example, the individual entity information for a particular network entity may include a distribution indicator that is indicative of whether the particular network entity has used the new certificate bundle in the certificate authentication process. The distribution indicator may include at least a portion of a message transmitted from the particular network entity to an additional network entity in association with the certificate authentication process. The message transmitted from the particular network entity to the additional network entity may include a current entity certificate being utilized by the particular network entity in the certificate authentication process.

With respect to the particular network entity, computing the aggregate metric at block 806 may include determining a match or a mismatch between the current entity certificate and the new entity certificate having been issued to the particular network entity. More particularly, a match between the current entity certificate and the new entity certificate indicates that the current entity certificate is the new entity certificate, and that new entity certificate is being utilized by the particular network entity in the certificate authentication process. Further, the match may indicate that the new entity certificate is installed on the storage medium associated with the particular network entity. A mismatch between the current entity certificate and the new entity certificate indicates that the current entity certificate is not the new entity certificate, and that the new entity certificate is not being utilized, or has yet to be utilized, by the particular network entity in the certificate authentication process. Further, the mismatch may indicate that the new entity certificate is not installed, or has yet to be installed, on the storage medium associated with the particular network entity.

In one example, the match or mismatch between the current entity certificate and the new entity certificate with respect to the particular network entity may be determined at least by performing a validation process upon a certificate chain that includes the current entity certificate and the at least one new CA certificate based upon which the CA issued the new entity certificate. If the certificate chain is valid, the validity of the certificate chain may indicate that the current entity certificate is the new entity certificate, and that the new entity certificate has been successfully distributed to the particular network entity. If the certificate chain is invalid, the invalidity of the certificate chain may indicate that the current entity certificate is not the new entity certificate, and that the new entity certificate has not been successfully distributed to the particular network entity.

In on example, the match or mismatch between the current entity certificate and the new entity certificate with respect to the particular network entity may be determined at least by comparing a hash value, such as a cryptographic hash value, representing the current entity certificate to a reference hash value representing the new entity certificate. If the hash value representing the current entity certificate matches the reference hash value representing the new entity certificate, the match may indicate that the current entity certificate is the new entity certificate, and that the new entity certificate has been successfully distributed to the particular network entity. If the hash value representing the current entity certificate mismatches the reference hash value representing the new entity certificate, the mismatch may indicate that the current entity certificate is not the new entity certificate, and that the new entity certificate has not been successfully distributed to the particular network entity.

In one example, the aggregate metric may include a number or a proportion of the plurality of network entities with respect to which the particular network entity has used the new entity certificate in the certificate authentication process. In one example, the determination as to whether a particular network entity has used the new entity certificate in the certificate authentication process may be performed periodically, for example, until a threshold is met for the number or the proportion of the plurality of network entities with respect to which the particular network entity has used the new entity certificate in the certificate authentication process.

For example, the operations 800 may include determining a mismatch between the current entity certificate and the new entity certificate with respect to a particular network entity, and determining that the aggregate metric fails to meet the threshold at least as a result of the mismatch. Further, the operations 800 may include obtaining, with respect to the particular network entity, a second instance of the distribution indicator, such as a second instance of at least a portion of a message transmitted from the particular network entity to an additional network entity in association with the certificate authentication process. Further, the operations 800 may include determining, with respect to the second instance of the distribution indicator, a match between the current entity certificate and the new entity certificate, and determining that the aggregate metric meets the threshold at least as a result of the match.

In one example, the operations 800 may include generating an alert in an alert log responsive to determining, based on the mismatch between the current entity certificate and the new entity certificate with respect to a particular network entity, that the particular network entity has not utilized the new entity in the certificate authentication process. The alert may indicate, based on the mismatch between the current entity certificate and the new entity certificate, an unsuccessful distribution of the new entity certificate to the particular network entity. Additionally, or in the alternative, the operations 800 may include initiating a restart process with respect to the particular network entity responsive to determining the mismatch between the current entity certificate and the new entity certificate. The restart process may include the particular network entity downloading, receiving, installing, loading, or accessing, the new entity certificate.

D. Determining Completion of Phase of Distribution Process Based on Successful Removal of Earlier CA Certificates and/or Earlier Entity Certificates.

Referring further to FIG. 8, in one example, the operations 800 with respect to the second phase of the certificate bundle distribution process at block 816 may include determining that the second phase of the certificate bundle distribution process is complete. In one example, the second phase of the certificate bundle distribution process may be the final phase of the certificate bundle distribution process. Additionally, or in the alternative, the operations 800 with respect to the second phase of the certificate bundle distribution process at block 816 may include determining, based on the completion of the second phase, that the certificate bundle distribution process is complete.

In one example, the second phase at block 816, such as the final phase of the certificate bundle distribution process, may include, for each particular network entity of the plurality of network entities, removing or deleting from a storage medium associated with the particular network entity, at least one earlier CA certificate, for example, as described with reference to block 712 of FIG. 7. Additionally, or in the alternative, the second phase at block 816, such as the final phase of the certificate bundle distribution process, may include for each particular network entity of the plurality of network entities, removing, or deleting from the storage medium associated with the particular network entity, an earlier entity certificate having been issued to the particular network entity based on the at least one earlier CA certificate.

In one example, the operations 800 may include obtaining, for each particular network entity, additional individual entity information associated with a progress of the particular network entity in relation to the second phase. The additional individual entity information may include an additional distribution indicator, indicative of the second phase having been completed with respect to the particular network entity. The additional distribution indicator may include an indication of whether new certificate bundle installed on the storage medium associated with the particular network entity reflects the at least one earlier CA certificate having been removed or deleted.

In one example, the operations 800 may include computing, based on the additional individual entity information for each particular network entity, an aggregate completion metric indicative of an aggregate status of the plurality of network entities in relation to completing the second phase of the certificate bundle distribution process at block 816. Further, the operations 800 may include determining, based on the aggregate completion metric, that one or more completion criteria are satisfied for completing the second phase of the certificate bundle distribution process. The one or more completion criteria may include the aggregate completion metric meeting a threshold. The operations 800 may further determining, based on the one or more completion criteria having been satisfied, that the second phase of the certificate bundle distribution process is complete.

In one example, the additional distribution indicator may include a hash value, such as a cryptographic hash value, representing a first certificate bundle installed on the storage medium associated with the particular network entity. With respect to the particular network entity, computing the aggregate completion metric may include comparing the hash value representing the first certificate bundle to a reference hash value representing the new certificate bundle that reflects the at least one earlier CA certificate having been removed or deleted. The operations 800 may include determining, based on the match, that the first certificate bundle is the new certificate bundle. Further, the match may indicate that the new certificate bundle installed on the storage medium associated with the particular network entity reflects the at least one earlier CA certificate having been removed or deleted.

7. Authenticating Network Entities

Network entities may utilize the CA certificates in a certificate bundle to authenticate other network entities associated with the virtual cloud network. For example, communications between network entities may be conducted according to a security protocol. The security protocol may include authenticating a network entity based on an entity certificate issued to the network entity by a CA, for example, prior to establishing communications with the network entity.

In one example, the entity certificate and a CA certificate corresponding to the CA that issued the entity certificate may represent at least a portion of a certificate chain. To authenticate the network entity, each signature-key pair in the certificate chain is validated. In one example, a top-level CA may issue the entity certificate, in which case the certificate chain may include one signature-key pair—that is, the digital signature of the top-level CA in the entity certificate, and the public key of the top-level CA. Such a top-level CA is sometimes referred to as a root CA. In another example, the certificate chain may include signature-key pairs corresponding to multiple CA certificates. For example, a root CA may issue an intermediate CA certificate to an intermediate CA, and the intermediate CA may issue the entity certificate to the network entity. In this case, the certificate chain includes two signature-key pairs—that is, (i) the digital signature of the intermediate CA in the entity certificate, and the public key of the intermediate CA; and (ii) the digital signature of the root CA in the intermediate CA certificate, and the public key of the root CA.

As used herein, the term "certificate authority certificate" or "CA certificate" refers to a digital certificate issued by a CA to establish its own identity and authenticity. A certificate authority certificate may be a root CA certificate or an intermediate CA certificate. A certificate authority certificate may be used to sign and issue other digital certificates, including those used for secure communication between network entities.

As used herein, the term "certificate authority" or "CA" refers to an entity responsible for issuing and managing digital certificates. The CA verifies the identity of network entities and digitally signs their certificates to attest to their authenticity.

As used herein, the term "root certificate authority certificate" or "root CA certificate" refers to a top-level CA certificate in a certificate chain or hierarchy. A root CA certificate may be self-issued and/or self-signed by a root CA. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root CA. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate CA according to a root CA.

As used herein, the term "entity certificate" refers to a digital certificate issued to an entity, such as a network entity associated with a virtual cloud network. An entity certificate may be used to verify the identity of the entity and enable secure communication between entities, such as between network entities in a virtual cloud network. An entity certificate may be issued by a CA, such as root CA or an intermediate CA.

In one example, an entity certificate may be an instance principal certificate. As used herein, the term "instance principal certificate" refers to a digital certificate used to authenticate and secure communication for an instance or VM associated with a virtual cloud network. In one example, instances and VMs may be created, scaled, and terminated dynamically. Instance principal certificates may be associated with an instance or VAM during its lifecycle and may be automatically generated and managed by the virtual cloud network infrastructure. An instance principal certificate may have limited access to communicate with certain network entities based on permissions assigned to the network entity to which the instance principal certificate is issued.

As used herein, the term "digital certificate" refers to a digitally signed electronic document that binds a public key to the identity of an entity. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

8. Validating Network Entity Certificate Chains

One or more embodiments may include techniques described in U.S. patent application Ser. No. 18/354,498, filed Jul. 18, 2023 (the '498 application). The entirety of the '498 application is incorporated herein by reference. In one example, one or more embodiments may include one or more systems, components, and/or operations pertaining to validating network entity certificate chains as described in the '498 application.

Referring now to FIGS. 9A-9D, operations pertaining to transitioning, such as concurrently transitioning, a plurality of network entities through a series of phases of a certificate bundle distribution process are further described. One or more operations 900 described with reference to FIGS. 9A-9D may be modified, rearranged, or omitted all together. Accordingly, the particular sequence of operations 900 described with reference to FIGS. 9A-9D should not be construed as limiting the scope of one or more embodiments. In one example, the operations 900 described with reference to FIGS. 9A-9D may correspond to Phase 1 and/or Phase 3 of the operations described with reference to FIG. 7. Additionally, or in the alternative, the operations 900 described with reference to FIGS. 9A-9D may correspond to one or more operations described with reference to FIGS. 8A-8D.

Figure 9A:
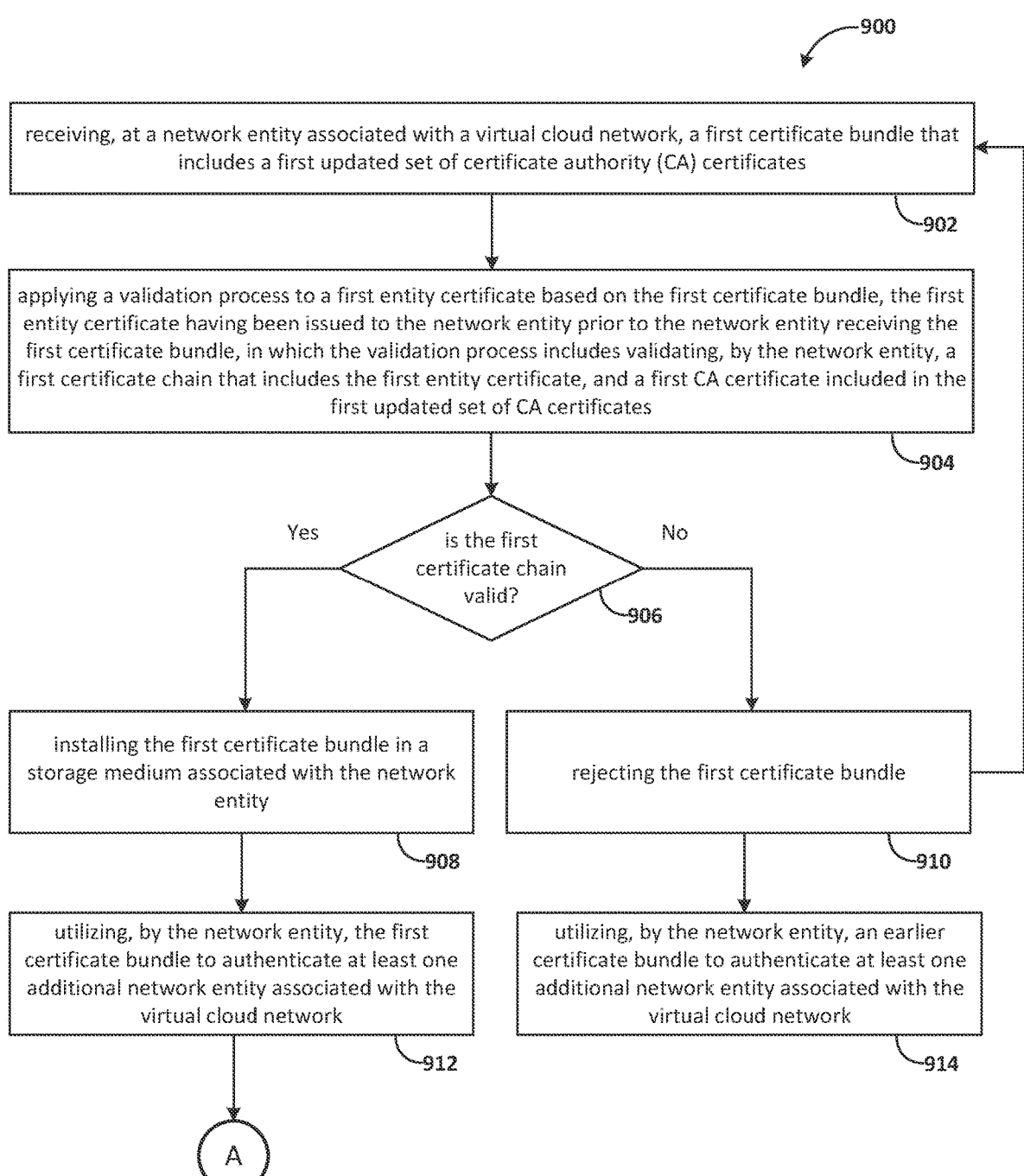
FIGS. 9A-9D are flowcharts that illustrate further example operations pertaining to transitioning a plurality of network entities associated with a virtual cloud network through a series of phases of a certificate bundle distribution process in accordance with one or more embodiments.

Referring to FIGS. 9A-9D, operations 900 associated with a network entity are described. As shown in FIG. 9A, the operations 900 may include, at block 902, receiving, at a network entity associated with a virtual cloud network, a first certificate bundle that includes a first updated set of CA certificates. The network entity may be a substrate entity, an interface entity, or an overlay entity. The first updated set of CA certificates may include earlier CA certificates and new CA certificates. In one example, the first certificate bundle may be transmitted to the network entity in response to an update request made by the network entity.

At block 904, the operations 900 may include applying a validation process to a first entity certificate having been issued to the network entity prior to the network entity receiving the first certificate bundle. The first entity certificate may be received and installed prior to receiving the first certificate bundle. The validation process may include validating, by the network entity, a first certificate chain that includes the first entity certificate, and a first CA certificate included in the first updated set of CA certificates. The first CA certificate may be a earlier CA certificate. The first certificate chain may be validated according to a validation process that includes one or more validation operations including, for example, the validation operations described with reference to FIG. 9C. At block 906, the operations 900 may include determining whether the validation operations at block 904 resulted in a determination that first certificate chain valid. In on example, one or more transition criteria for transitioning a plurality of network entities from a current phase to a next phase of a series of phases of a certificate bundle distribution process may be based at least in part on a degermation, with respect to one or more particular network entities, that the first certificate chain is valid for a particular network entity. For example, a transition criterion for transitioning from Phase 1 to Phase 2 of the certificate bundle distribution process described with reference to FIG.

7 may include a determination, with respect to one or more particular network entities, that the first certificate chain is valid for a particular network entity. For a determination that the first certificate chain is valid for a particular network entity, the operations 900 may proceed to block 908. For a determination that the first certificate chain is invalid for a particular network entity, the operations 900 may proceed to block 910.

At block 908, responsive to determining that the first certificate chain is valid, the operations 900 may include installing the first certificate bundle in a storage medium associated with the network entity. Upon having installed the first certificate bundle, the operations 900 may include, at block 912, the network entity utilizing the first certificate bundle to authenticate at least one additional network entity associated with the virtual cloud network. Additionally, or in the alternative, at block 910, the operations 900 may include rejecting the first certificate bundle responsive to determining that the first certificate chain is invalid. Responsive to rejecting the first certificate bundle, the operations 900 may include, at block 914, the network entity utilizing an earlier certificate bundle to authenticate at least one additional network entity associated with the virtual cloud network.

In one example, the operations 900 may include forwarding a certificate bundle to another network entity, such as an overlay entity. The operations 900 may include receiving, at the network entity, a first certificate bundle request from an overlay entity. The first certificate bundle request may be received subsequent to validating the first certificate chain. The network entity may be an interface entity. Responsive to the first certificate bundle request, the operations 900 may include transmitting the first certificate bundle, for example, from the interface entity to the overlay entity. The operations 900 may further include the overlay entity validating a first overlay entity certificate chain that includes a first entity certificate having been issued to the overlay entity, and a CA certificate of the first updated set of CA certificates, such as a earlier CA certificate. In one example, the first entity certificate issued to the overlay entity may be a first instance principal certificate. Responsive to the overlay entity validating the first overlay entity certificate chain, the operations 900 may include installing the first certificate bundle. The operations 900 may further include the overlay entity utilizing the first certificate bundle to authenticate at least one additional entity associated with the virtual cloud network.

In one example, the operations 900 may include transmitting, to the overlay entity, a second entity certificate, such as a second instance principal certificate, issued to the overlay entity. The second instance principal certificate may be transmitted to the overlay entity by the interface entity, for example, subsequent to the interface entity having validated the second certificate chain. The operations 900 may include the overlay entity installing the second instance principal certificate.

Figure 9B:
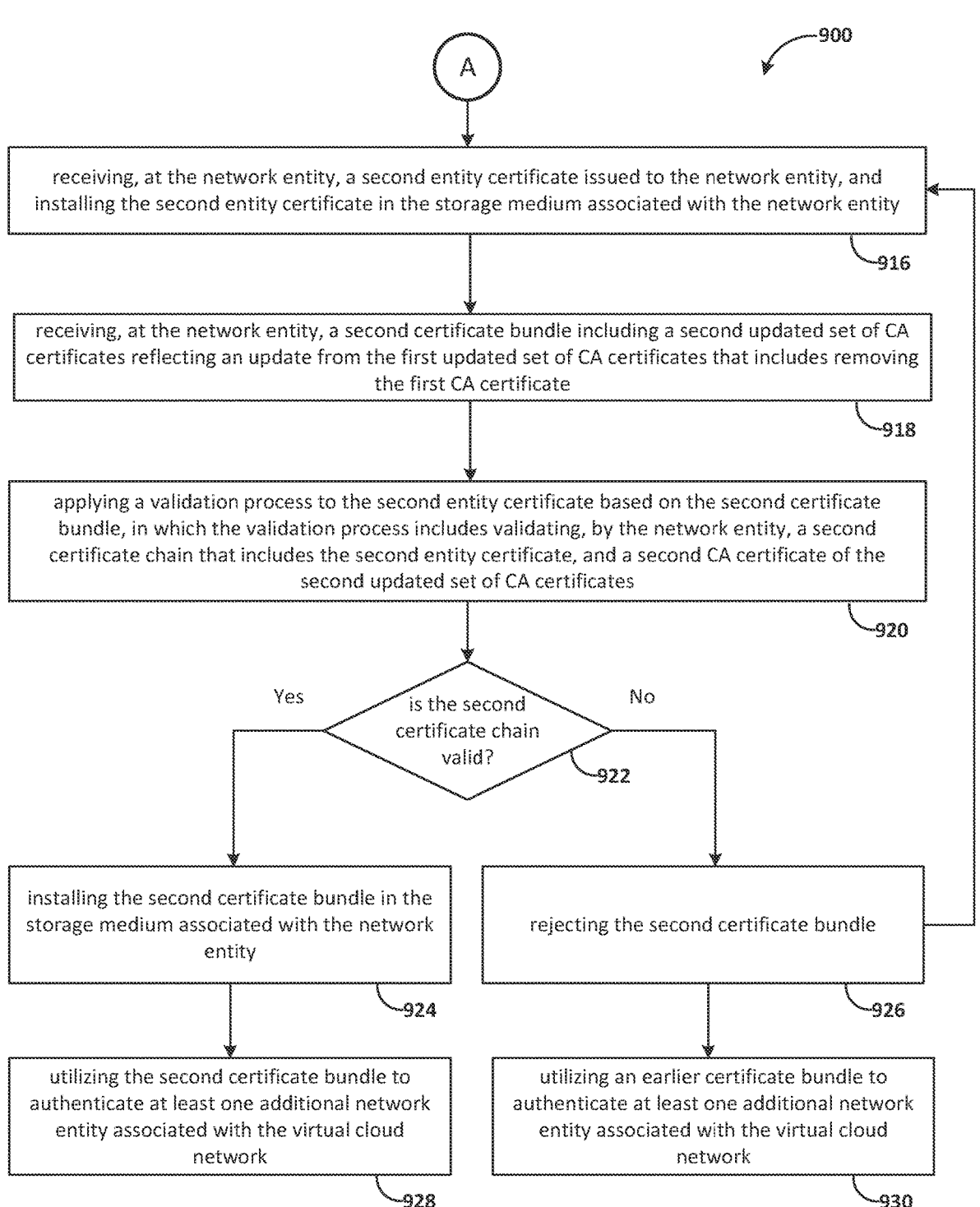

Referring now to FIG. 9B, operations 900 associated with a network entity are further described. In one example, the operations described with reference to FIG. 9B may continue from block 912 of FIG. 9A. As shown in FIG. 9B, the operations 900 may include, at block 916, receiving, at the network entity, a second entity certificate issued to the network entity, and installing the second entity certificate in the storage medium associated with the network entity. The second entity certificate may have been issued by a CA corresponding to a new CA certificate in the first certificate bundle distributed to the network entity and installed by the network entity, for example, as described with reference to FIG. 9A. At block 918, the operations 900 may include receiving, at the network entity, a second certificate bundle including a second updated set of CA certificates reflecting an update from the first updated set of CA certificates that includes removing the first CA certificate. The first CA certificate may be a earlier CA certificate. The second updated set of CA certificates may include new CA certificates. Additionally, or in the alternative, the second updated set of CA certificates may include earlier CA certificates that have not been superseded by a new CA certificate in the second certificate bundle. In one example, the second certificate bundle may be transmitted to the network entity in response to an update request made by the network entity.

At block 920, the operations 900 may include applying a validation process to the second entity certificate based on the second certificate bundle. The validation process may include validating, by the network entity, a second certificate chain that includes the second entity certificate, and a second CA certificate of the second updated set of CA certificates. The second CA certificate may be a new CA certificate or an earlier CA certificate that has not been superseded by a new CA certificate in the second certificate bundle. The second certificate chain may be validated according to a validation process that includes one or more validation operations including, for example, the validation operations described with reference to FIG. 9C.

At block 922, the operations 900 may include determining whether the validation operations at block 920 resulted in a determination that second certificate chain valid. In on example, one or more transition criteria for transitioning a plurality of network entities from a current phase to a next phase of a series of phases of a certificate bundle distribution process may be based at least in part on a degermation, with respect to one or more particular network entities, that the second certificate chain is valid for a particular network entity. For example, a transition criterion for transitioning from Phase 3 to Phase 4 of the certificate bundle distribution process described with reference to FIG. 7 may include a determination, with respect to one or more particular network entities, that the second certificate chain is valid for a particular network entity. For a determination that the second certificate chain is valid, the operations 900 may proceed to block 924. For a determination that the second certificate chain is invalid, the operations 900 may proceed to block 926.

At block 924, responsive to determining that the second certificate chain is valid, the operations 900 may include installing the second certificate bundle in the storage medium associated with the network entity. Upon having installed the second certificate bundle, the operations 900 may include, at block 928, the network entity utilizing the second certificate bundle to authenticate at least one additional network entity associated with the virtual cloud network. Additionally, or in the alternative, at block 926, the operations 900 may include rejecting the fir second certificate bundle responsive to determining that the second certificate chain is invalid. Responsive to rejecting the second certificate bundle, the operations 900 may include, at block 930, the network entity utilizing an earlier certificate bundle to authenticate at least one additional network entity associated with the virtual cloud network. In one example, subsequent to validating the second certificate chain, the operations 900 may include uninstalling the first entity certificate.

In one example, the operations 900 may include receiving, at the interface entity, a second certificate bundle request from the overlay entity. Responsive to the second certificate bundle request, the operations 900 may include transmitting the second certificate bundle, for example, from the interface entity to the overlay entity. The operations 900 may further include the overlay entity validating a second overlay entity certificate chain that includes a second entity certificate, such as a second instance principal certificate, having been issued to the overlay entity, and a CA certificate of the second updated set of CA certificates. Responsive to the overlay entity validating the second overlay entity certificate chain, the operations 900 may include installing the second certificate bundle. The operations 900 may further include uninstalling the first entity certificate, for example, subsequent to validating the second overlay entity certificate chain. The operations 900 may further include the overlay entity utilizing the second certificate bundle to authenticate at least one additional entity associated with the virtual cloud network. In one example, the interface entity may utilize the second certificate bundle to authenticate the overlay entity, and/or the overlay entity utilize the second certificate bundle to authenticate the interface entity.

Figure 9C:
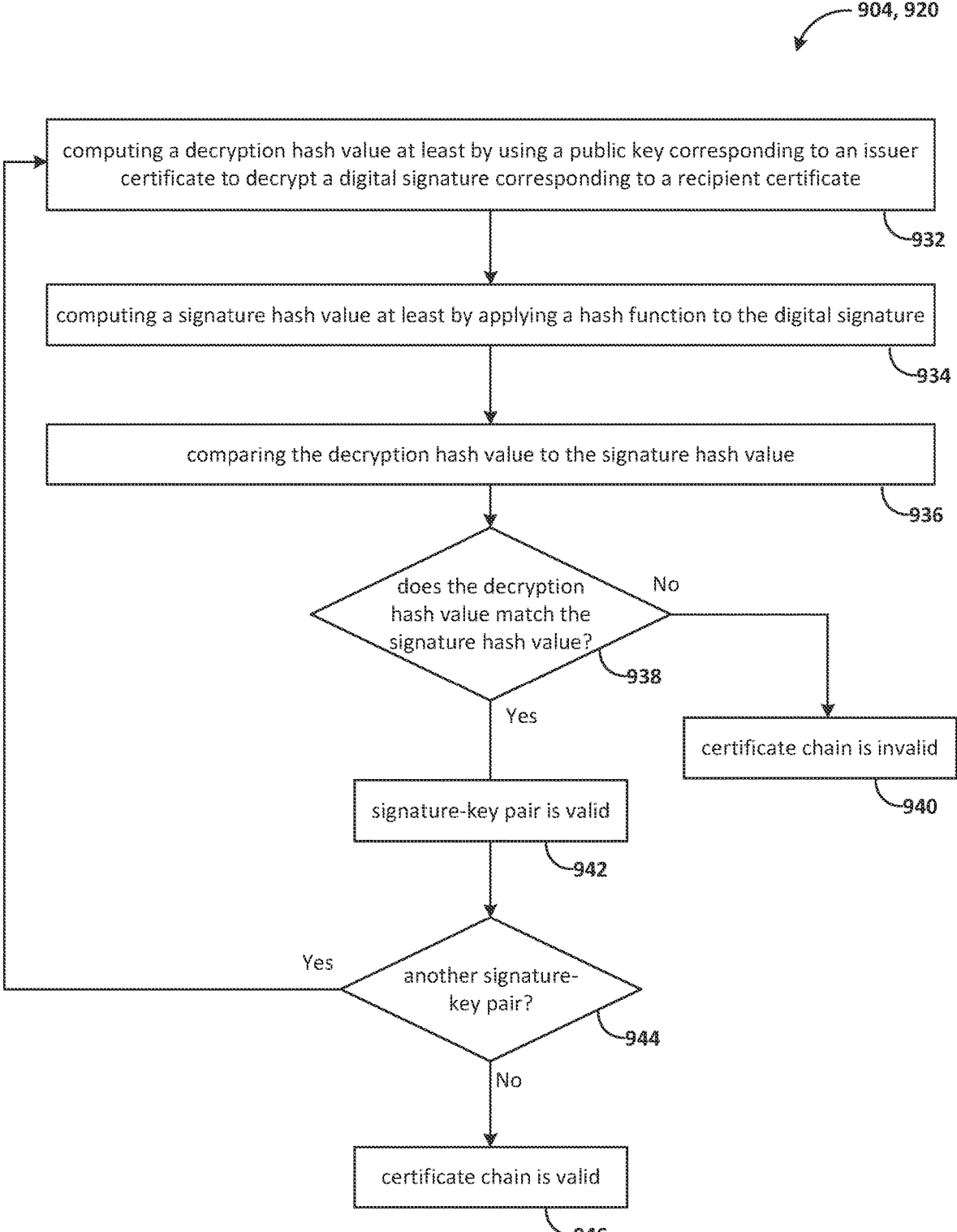

Referring now to FIG. 9C, example operations 900 associated with a network entity are further described. The operations 900 may include operations associated with validating a certificate chain, such as validating the first certificate chain at block 904 as described with reference to FIG. 9A and/or validating the second certificate chain at block 920 as described with reference to FIG. 9B. The operations shown in FIG. 9C may be repeated for each signature-key pair in the certificate chain. The certificate chain may include a set of signature-key pairs, and each signature-key pair of the set of signature-key pairs may respectively include a public key corresponding to an issuer certificate and a digital signature corresponding to a recipient certificate.

In one example, a certificate chain may include a signature-key pair for a digital signature in an entity certificate and a public key corresponding to a CA certificate of a CA that is the issuer of the entity certificate. In one example, the CA that issued the entity certificate may be a root CA and the CA certificate may be a root CA certificate. In one example, the CA that issued the entity certificate may be an intermediate CA and the CA certificate may be an intermediate CA certificate. Additionally, or in the alternative, a certificate chain may include a signature-key pair for a digital signature in the intermediate CA certificate and a public key corresponding to a CA certificate of a CA this is the issuer of the intermediate CA certificate. In one example, the intermediate CA may be the issuer of the entity certificate, and the root CA may be the issuer of the intermediate CA certificate.

As shown in FIG. 9C, operations 900 for a respective signature-key pair of a certificate chain are described. As shown, the operations 900 may include, at block 932 computing a decryption hash value at least by using a public key corresponding to an issuer certificate to decrypt a digital signature corresponding to a recipient certificate. For one signature-key pair, the issuer certificate may be the CA certificate and the recipient certificate may be the entity certificate. In one example, the CA certificate may be an intermediate CA certificate. For another signature-key pair, the recipient certificate may be the CA certificate, and the issuer certificate may be a higher-level CA certificate. For example, the recipient certificate may be an intermediate CA certificate, and the issuer certificate may be a root CA certificate.

At block 934, the operations 900 may include computing a signature hash value at least by applying a hash function to the digital signature, and at block 936, the operations 900 may include comparing the decryption hash value to the signature hash value. At block 938, the operations may include determining whether the decryption hash value matches the signature hash value. For a decryption hash value that mismatches the signature hash value, the operations may include, at block 940, determining that the certificate chain is invalid. In one example, the certificate chain may be determined invalid at block 940 when the decryption hash value mismatches the signature hash value for any of the signature-key pairs in the certificate chain. For a decryption hash value that matches the signature hash value, the operations 900 may include, at block 942, determining that the signature-key pair is valid. At block 944, the operations 900 may include at block 944, determining whether the certificate chain includes another signature-key pair. For a signature chain that includes another signature-key pair, the operations 900 may return to block 932. For a signature chain that does not include another signature-key pair, the operations 900 may include, at block 946, determining that the certificate chain is valid. The certificate chain may be determined valid when the decryption hash value matches the signature hash value for each of the signature-key pairs.

Figure 9D:
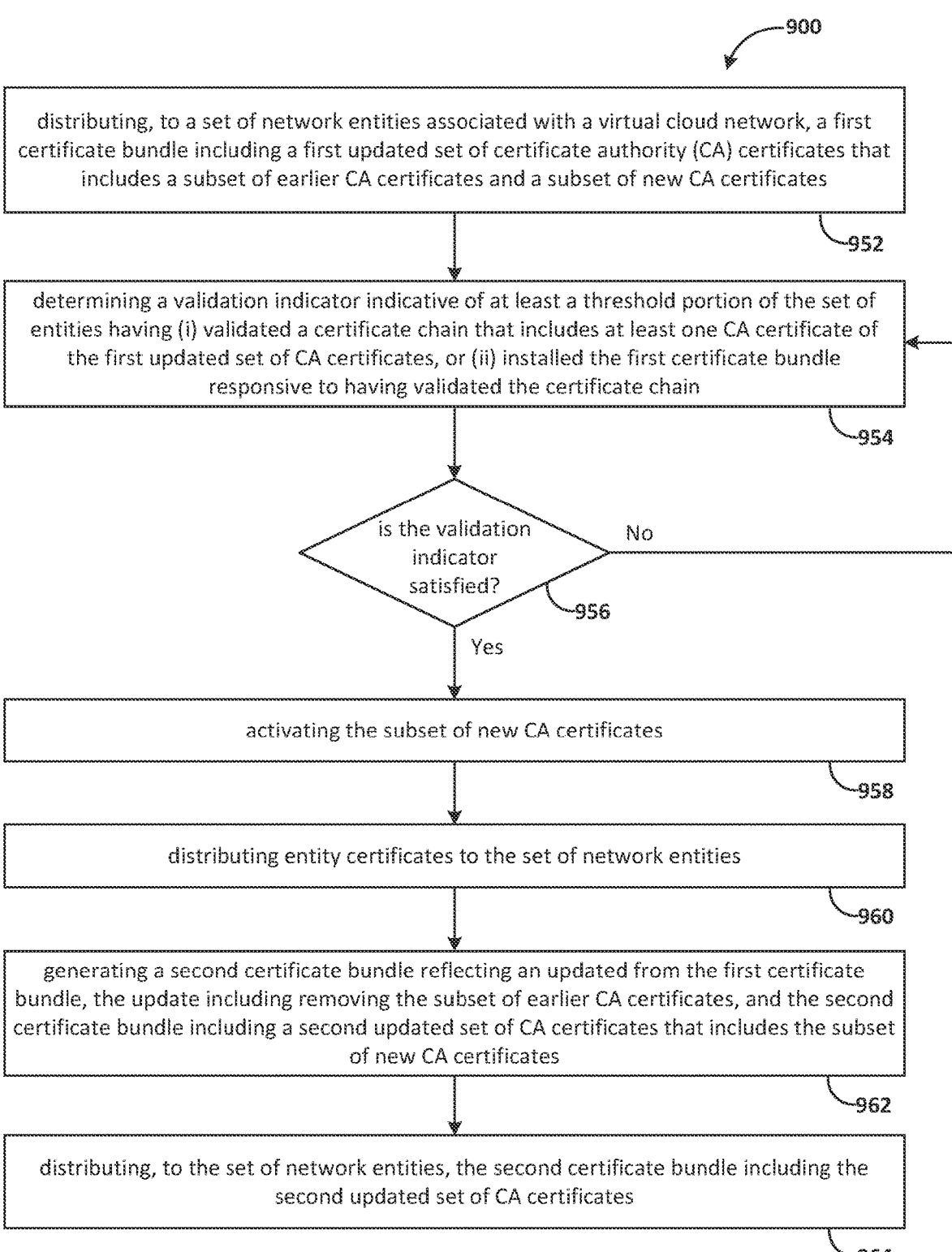

Referring now to FIG. 9D, operations 900 associated with a distribution service are described. As shown in FIG. 9D, the operations 900 may include, at block 952 distributing a first certificate bundle to a set of network entities associated with a virtual cloud network. The first certificate bundle may include a first updated set of CA certificates that includes a subset of earlier CA certificates and a subset of new CA certificates. In one example, the first certificate bundle may be distributed to the set of network entities responsive to one or more update requests. For example, the first certificate bundle may be transmitted to a respective network entity responsive to an update request from the respective network entity. The operations at block 952 may correspond to Phase 1 of the certificate bundle distribution process described with reference to FIG. 7.

At block 954, the operations 900 may include determining a validation indicator. The validation indicator may be indicative of at least a threshold portion of the set of entities having validated a certificate chain that includes at least one CA certificate of the first updated set of CA certificates. The certificate chain that is validated may include an entity certificate and an earlier CA certificate from among the subset of earlier CA certificates. Additionally, or in the alternative, the validation indicator may be indicative of at least the threshold portion of the set of entities having installed the first certificate bundle responsive to having validated the certificate chain. In one example, the validation indicator may include at least one of: a time period having elapsed, a notification from or representing the threshold portion of the set of network entities, or an update request from or representing the threshold portion of the set of network entities.

At block 956, the operations 900 may include determining whether the validation indicator described with block 954 is satisfied. The transition criteria for the transition from Phase 1 to Phase 2 of the certificate bundle distribution process described with reference to FIG. 7 may include the validation indicator having been satisfied determined at block 954. For a validation indicator that is satisfied, the operations 900 may proceed to block 958. For a validation indictor that is unsatisfied, the operations 900 may return to block 954. At block 958, the operations 900 may include activating the subset of new CA certificates. The operations at block 958 may correspond to Phase 2 of the certificate bundle distribution process described with reference to FIG. 7. At block 960, the operations 900 may include distributing new entity certificates to the set of network entities. The new entity certificates may have been issued, respectively, by a CA corresponding to a new CA certificate of the subset of new CA certificates. In one example, the operations 900 may include determining an install indicator indicative of at least a threshold portion of the network entities having installed the new entity certificate. The install indicator may include at least one of: a time period having elapsed, a notification from the respective entity, or an update request from the respective entity. The operations at block 960 may correspond to Phase 3 of the certificate bundle distribution process described with reference to FIG. 7. In one example, the operations 900 may include determining a validation indicator, as described with reference to block 954, utilizing the entity certificates distributed at block 960.

At block 962, the operations 900 may include generating a second certificate bundle reflecting an updated from the first certificate bundle. The update may include removing the subset of earlier CA certificates, such that the second certificate bundle includes a second updated set of CA certificates that includes the subset of new CA certificates. In one example, the second updated set of CA certificates may include a subset of earlier CA certificates that have not been superseded by a new CA certificate. At block 964, the operations 900 may include distributing, to the set of network entities, the second certificate bundle including the second updated set of CA certificates. The operations at block 962 may correspond to Phase 4 of the certificate bundle distribution process described with reference to FIG. 7. In one example, the operations 900 may include determining a validation indicator, as described with reference to block 954, utilizing the entity certificates distributed at block 960 and the second certificate bundle distributed at block 964. In one example, the second certificate bundle may be distributed to the set of network entities responsive to one or more update requests. For example, the second certificate bundle may be transmitted to a respective network entity responsive to an update request from the respective network entity.

9. Miscellaneous; Extensions

Embodiments are directed to a system with one or more devices that include a hardware processor and that are configured to perform any of the operations described herein and/or recited in any of the claims below.

Embodiments are directed to a system including means to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Further aspects of the presently disclosed subject matter are provided by the following clauses:

One or more non-transitory computer readable media comprising instructions which, when executed by one or more hardware processors, causes performance of operations comprising: obtaining, for a particular network entity, from among a plurality of network entities associated with a virtual cloud network, a first hash value representing a first certificate bundle installed on a storage medium associated with the particular network entity, wherein the first certificate bundle comprises a first set of one or more certificate authority (CA) certificates; comparing the first hash value to a reference hash value representing a new certificate bundle comprising a new set of one or more CA certificates, wherein the new certificate bundle is associated with a certificate bundle distribution process for distributing the new set of one or more CA certificates to the plurality of network entities; determining a mismatch between the first hash value and the reference hash value, wherein the mismatch indicates that the first certificate bundle mismatches the new certificate bundle; and responsive to determining the mismatch, performing at least one of: generating an alert in an alert log, the alert indicating, based on the mismatch between the first certificate bundle and the new certificate bundle, an unsuccessful distribution of the new certificate bundle to the particular network entity, or initiating a restart process with respect to the particular network entity, wherein the restart process comprises the particular network entity performing at least one of: downloading, receiving, installing, loading, or accessing, the new certificate bundle.

One or more non-transitory computer readable media comprising instructions which, when executed by one or more hardware processors, causes performance of operations comprising: distributing, to a network entity associated with a virtual cloud network, a new certificate bundle comprising a new set of one or more CA certificates, wherein the new certificate bundle is intended to replace an earlier certificate bundle; obtaining, for the network entity, a bundle-load time indicative of a first timestamp for a first certificate bundle being loaded onto a storage medium associated with the network entity, and a restart time indicative of a second timestamp for the network entity performing a first restart process; comparing the bundle-load time to the restart time; determining, based on the bundle-load time being subsequent to the restart time, that the new certificate bundle has yet to be loaded onto the storage medium associated with the network entity, wherein the bundle-load time being subsequent to the restart time indicates that the first certificate bundle differs from the new certificate bundle; and responsive to determining that the bundle-load time is subsequent to the restart time, performing at least one of: generating an alert in an alert log, the alert indicating, based on the bundle-load time being subsequent to the restart time, that the new certificate bundle has yet to be loaded onto the storage medium associated with the network entity, or initiating a second restart process with respect to the network entity, wherein the second restart process comprises the network entity performing at least one of: downloading, receiving, installing, loading, or accessing, the new certificate bundle.

One or more non-transitory computer readable media comprising instructions which, when executed by one or more hardware processors, causes performance of operations comprising: obtaining, for a network entity associated with a virtual cloud network, a first network entity certificate transmitted during a certificate authentication process; determining a mismatch between the first network entity certificate and a new entity certificate having been issued and distributed to the network entity, wherein the mismatch indicates the network entity utilizing an earlier entity certificate for the certificate authentication process; and responsive to determining the mismatch, performing at least one of: generating an alert in an alert log, the alert indicating, based on the mismatch, the network entity utilizing the earlier entity certificate for the certificate authentication process, or initiating a restart process with respect to the network entity, wherein the restart process comprises the network entity performing one or more of: downloading, receiving, installing, loading, or accessing, the new entity certificate.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer readable media comprising instructions which, when executed by one or more hardware processors, causes performance of operations comprising:

transitioning a plurality of network entities associated with a virtual cloud network through a series of phases of a certificate bundle distribution process for distributing a new set of one or more certificate authority (CA) certificates to the plurality of network entities for use in a certificate authentication process;

wherein transitioning the plurality of network entities through the series of phases of the certificate bundle distribution process comprises:

executing, by a certificate distribution service hosted on the virtual cloud network, in relation to each of the plurality of network entities, at least a first operation associated with a first phase of the series of phases of the certificate bundle distribution process;

obtaining, by a plurality of event collectors hosted, respectively, on each particular network entity of the plurality of network entities, individual entity information for each particular network entity of the plurality of network entities, the individual entity information for a particular network entity indicating a progress of the particular network entity in relation to the first phase;

detecting, by at least one listening service hosted on the virtual cloud network, the individual entity information obtained by the plurality of event collectors;

responsive to detecting the individual entity information obtained by the plurality of event collectors: transmitting the individual entity information to the certificate distribution service, wherein the certificate distribution service receives the individual entity information;

based on the individual entity information for each particular network entity of the plurality of network entities, generating, by the certificate distribution service, an aggregate metric indicative of an aggregate progress of the plurality of network entities in relation to the first phase;

determining, based on the aggregate metric, that one or more transition criteria are satisfied for transitioning the plurality of network entities from the first phase to a second phase of the series of phases of the certificate bundle distribution process; and responsive to determining that the one or more transition criteria are satisfied, executing, by the certificate distribution service, in relation to each of the plurality of network entities, at least a second operation associated with the second phase of the series of phases of the certificate bundle distribution process;

wherein executing at least the second operation comprises at least one of:

activating a first CA certificate of the new set of one or more CA certificates;

distributing, to a first network entity of the plurality of network entities, a first entity certificate issued to the first network entity based on the first CA certificate of the new set of one or more CA certificates; or removing or deleting a second CA certificate from a storage medium associated with the first network entity.

2. The one or more non-transitory computer readable media of claim 1, wherein the aggregate metric comprises a confidence measurement indicative of having satisfied the one or more transition criteria associated with the first phase;

wherein determining, based on the aggregate metric, that the one or more transition criteria are satisfied comprises determining that the confidence measurement meets a confidence threshold.

3. The one or more non-transitory computer readable media of claim 1, wherein the new set of one or more CA certificates comprises at least one of: one or more root CA certificates, or one or more intermediate CA certificates.

4. The one or more non-transitory computer readable media of claim 1, wherein obtaining the individual entity information comprises, for the first network entity of the plurality of network entities:

receiving the individual entity information from a certificate event collector hosted by the first network entity;

wherein the individual entity information comprises a cryptographic hash value representing at least one of:

a new certificate bundle comprising the new set of one or more CA certificates;

at least one of the one or more CA certificates in the new certificate bundle; or a new entity certificate having been issued to the particular network entity based on at least one of the one or more CA certificates in the new certificate bundle.

5. The one or more non-transitory computer readable media of claim 1, wherein the first phase comprises distributing, to each particular network entity of the plurality of network entities, a new certificate bundle comprising the new set of one or more CA certificates, wherein the new set of one or more CA certificates comprises at least one new CA certificate;

wherein the second phase comprises activating the at least one new CA certificate;

wherein the individual entity information comprises:

at least a first distribution indicator, indicative of the first phase having been completed with respect to the particular network entity, wherein the first distribution indicator comprises an indication of whether the new certificate bundle is installed on a storage medium associated with the particular network entity; and wherein generating the aggregate metric comprises:

determining a number or a proportion of the plurality of network entities with respect to which the new certificate bundle is installed on the storage medium associated with the particular network entity;

wherein determining that the one or more transition criteria are satisfied comprises:

determining that the aggregate metric meets a threshold.

6. The one or more non-transitory computer readable media of claim 5, wherein obtaining the individual entity information comprises:

obtaining, for the particular network entity, the first distribution indicator, wherein the first distribution indicator comprises a first hash value representing a first certificate bundle installed on the storage medium associated with the particular network entity, wherein the first certificate bundle comprises a plurality of CA certificates;

wherein, with respect to the particular network entity, generating the aggregate metric comprises:

comparing the first hash value to a reference hash value representing the new certificate bundle comprising the new set of one or more CA certificates; and determining, based on a match between the first hash value and the reference hash value, that the new certificate bundle is installed on the storage medium associated with the particular network entity, wherein the match indicates that the first certificate bundle is the new certificate bundle.

7. The one or more non-transitory computer readable media of claim 5, wherein obtaining the individual entity information comprises:

obtaining, for the first network entity of the plurality of network entities, a first instance of the first distribution indicator, wherein the first instance of the first distribution indicator comprises a first hash value representing a first certificate bundle installed on the storage medium associated with the first network entity, wherein the first certificate bundle comprises a first plurality of CA certificates;

wherein, with respect to the first network entity, generating the aggregate metric comprises:

comparing the first hash value to a reference hash value representing the new certificate bundle comprising the new set of one or more CA certificates; and determining a mismatch between the first hash value and the reference hash value, wherein the mismatch indicates that the first certificate bundle mismatches the new certificate bundle; and wherein the operations further comprise, prior to determining that the aggregate metric meets the threshold:

determining that the aggregate metric fails to meet the threshold, wherein the aggregate metric fails to meet the threshold at least as a result of the mismatch;

obtaining, for the first network entity, a second instance of the first distribution indicator, wherein the second instance of the first distribution indicator comprises a second hash value representing a second certificate bundle installed on the storage medium associated with the first network entity, wherein the second certificate bundle comprises a second plurality of CA certificates; and further generating the aggregate metric, wherein, with respect to the first network entity, further generating the aggregate metric comprises:

comparing the second hash value to the reference hash value; and determining a match between the second hash value and the reference hash value, wherein the match indicates that the second certificate bundle is the new certificate bundle;

wherein determining that the aggregate metric meets the threshold occurs subsequent to determining the match, wherein the aggregate metric meets the threshold at least as a result of the match.

8. The one or more non-transitory computer readable media of claim 1, wherein the first phase comprises distributing, to each of the plurality of network entities, a new certificate bundle comprising the new set of one or more CA certificates, wherein the new set of one or more CA certificates comprises at least one new CA certificate;

wherein the second phase comprises activating the at least one new CA certificate;

wherein the individual entity information comprises:

at least a first distribution indicator, indicative of the first phase having been completed with respect to the particular network entity, wherein the first distribution indicator comprises an indication of whether the particular network entity has loaded the new certificate bundle;

wherein generating the aggregate metric comprises:

determining a number or a proportion of the plurality of network entities with respect to which the particular network entity has loaded the new certificate bundle;

wherein determining that the one or more transition criteria are satisfied comprises:

determining that the aggregate metric meets a threshold.

9. The one or more non-transitory computer readable media of claim 8, wherein obtaining the individual entity information comprises:

obtaining, for the particular network entity, the first distribution indicator and a second distribution indicator, wherein the first distribution indicator comprises a bundle-load time indicative of a first timestamp for a first certificate bundle being loaded onto a storage medium associated with the particular network entity, wherein the second distribution indicator comprises a restart time indicative of a second timestamp for the particular network entity performing a restart process; and wherein, with respect to the particular network entity, generating the aggregate metric comprises:

comparing the restart time to the bundle-load time;

determining that the restart time is subsequent to the bundle-load time; and determining, based on the restart time being subsequent to the bundle-load time, that the new certificate bundle is loaded onto the storage medium associated with the particular network entity, wherein the restart time being subsequent to the bundle-load time indicates that the first certificate bundle is the new certificate bundle.

10. The one or more non-transitory computer readable media of claim 9, wherein the particular network entity is a first host located on the virtual cloud network, and wherein the restart process comprises rebooting the first host; or wherein the particular network entity is a service executing on a second host located on the virtual cloud network, and wherein the restart process comprises reloading the service.

11. The one or more non-transitory computer readable media of claim 8, wherein obtaining the individual entity information comprises:

obtaining, for the first network entity of the plurality of network entities, a first instance of (i) the first distribution indicator and (ii) a second distribution indicator, wherein the first distribution indicator comprises a bundle-load time indicative of a first timestamp for a first certificate bundle being loaded onto a storage medium associated with the particular network entity, wherein the second distribution indicator comprises a restart time indicative of a second timestamp for the particular network entity performing a restart process; and wherein, with respect to the first instance for the first network entity, generating the aggregate metric comprises:

comparing the restart time to the bundle-load time;

determining that the bundle-load time is subsequent to the restart time; and determining, based on the bundle-load time being subsequent to the restart time, that the new certificate bundle has yet to be loaded onto the storage medium associated with the particular network entity, wherein the bundle-load time being subsequent to the restart time indicates that the first certificate bundle differs from the new certificate bundle;

wherein the operations further comprise, prior to determining that the aggregate metric meets the threshold:

determining that the aggregate metric fails to meet the threshold, wherein the aggregate metric fails to meet the threshold at least as a result of the new certificate bundle having yet to be loaded onto the storage medium associated with the particular network entity; and obtaining, for the first network entity, a second instance of (i) the first distribution indicator and (ii) the second distribution indicator;

wherein the second instance of the first distribution indicator comprises a second bundle-load time indicative of a third timestamp for a second certificate bundle being loaded onto the storage medium associated with the particular network entity, wherein the second instance of the second distribution indicator comprises a second restart time indicative of a fourth timestamp for the particular network entity performing a second restart process; and further generating the aggregate metric, wherein, with respect to the second instance for the first network entity, further generating the aggregate metric comprises:

comparing the second restart time to the second bundle-load time;

determining that the second restart time is subsequent to the second bundle-load time; and determining, based on the second restart time being subsequent to the second bundle-load time, that the new certificate bundle is loaded onto the storage medium associated with the particular network entity, wherein the second restart time being subsequent to the second bundle-load time indicates that the second certificate bundle is the new certificate bundle;

wherein determining that the aggregate metric meets the threshold occurs subsequent to determining that the second restart time is subsequent to the second bundle-load time, wherein the aggregate metric meets the threshold at least as a result of the second restart time being subsequent to the second bundle-load time.

12. The one or more non-transitory computer readable media of claim 1, wherein the first phase comprises distributing, to each particular network entity of the plurality of network entities, a new entity certificate having been issued to the particular network entity based on at least one new CA certificate of the new set of one or more CA certificates;

wherein the second phase comprises, for each particular network entity of the plurality of network entities, removing or deleting, from a storage medium associated with the particular network entity, at least one earlier CA certificate, wherein prior to removing or deleting the at least one earlier CA certificate, the new set of one or more CA certificates comprises: the at least one new CA certificate and the at least one earlier CA certificate;

wherein the individual entity information comprises:

at least a first distribution indicator, indicative of the first phase having been completed with respect to the particular network entity, wherein the first distribution indicator comprises an indication of whether the particular network entity has used the new entity certificate in the certificate authentication process;

wherein generating the aggregate metric comprises:

determining a number or a proportion of the plurality of network entities with respect to which the particular network entity has used the new entity certificate in the certificate authentication process;

wherein determining that the one or more transition criteria are satisfied comprises:

determining that the aggregate metric meets a threshold.

13. The one or more non-transitory computer readable media of claim 12, wherein obtaining the individual entity information comprises:

obtaining, for the particular network entity, the first distribution indicator, wherein the first distribution indicator comprises at least a portion of a message transmitted from the particular network entity to an additional network entity in association with the certificate authentication process between the particular network entity and the additional network entity, wherein the message comprises a current entity certificate;

wherein, with respect to the particular network entity, computing generating the aggregate metric comprises:

determining a match between the current entity certificate and the new entity certificate having been issued to the particular network entity, wherein the match indicates that the current entity certificate is the new entity certificate; and determining, based on the match between the current entity certificate and the new entity certificate, that the new entity certificate is being utilized by the particular network entity in association with the certificate authentication process.

14. The one or more non-transitory computer readable media of claim 13, wherein determining the match between the current entity certificate and the new entity certificate comprises:

performing a validation process upon a first certificate chain comprising the current entity certificate and the at least one new CA certificate of the new set of one or more CA certificates; and determining, based on the validation process, that the first certificate chain is valid;

wherein, based on the new entity certificate having been issued to the particular network entity based on the at least one new CA certificate, the first certificate chain being valid indicates that the current entity certificate is the new entity certificate.

15. The one or more non-transitory computer readable media of claim 13, wherein determining the match between the current entity certificate and the new entity certificate comprises:

comparing a first hash value representing the current entity certificate to a reference hash value representing the new entity certificate;

determining that the first hash value matches the reference hash value; and determining, based on the first hash value matching the reference hash value, that the current entity certificate is the new entity certificate.

16. The one or more non-transitory computer readable media of claim 13, wherein obtaining the individual entity information comprises:

obtaining, for the first network entity of the plurality of network entities, a first instance of the first distribution indicator, wherein the first instance of the first distribution indicator comprises at least a portion of a first message transmitted from the first network entity to a second network entity in association with a first certificate authentication process between the first network entity and the second network entity, wherein the first message comprises the first entity certificate;

wherein, with respect to the first network entity, generating the aggregate metric comprises:

determining a mismatch between the first entity certificate and the new entity certificate having been issued to the first network entity, wherein the mismatch indicates that the first entity certificate differs from the new entity certificate; and wherein the operations further comprise, prior to determining that the aggregate metric meets the threshold:

determining that the aggregate metric fails to meet the threshold, wherein the aggregate metric fails to meet the threshold at least as a result of the mismatch;

obtaining, for the first network entity, a second instance of the first distribution indicator;

wherein the second instance of the first distribution indicator comprises at least a portion of a second message transmitted from the first network entity to a third network entity in association with a second certificate authentication process between the first network entity and the third network entity, wherein the second message comprises a second entity certificate; and further generating the aggregate metric, wherein, with respect to the first network entity, further generating the aggregate metric comprises:

determining a first match between the second entity certificate and the new entity certificate having been issued to the first network entity, wherein the first match indicates that the second entity certificate is the new entity certificate;

wherein determining that the aggregate metric meets the threshold occurs subsequent to determining the first match, wherein the aggregate metric meets the threshold at least as a result of the first match.

17. The one or more non-transitory computer readable media of claim 12, wherein, with respect to the second phase, removing or deleting the at least one earlier CA certificate from the storage medium associated with the particular network entity comprises:

transmitting, to the particular network entity, an instruction to delete the at least one earlier CA certificate from the storage medium, wherein, responsive to receiving the instruction, the particular network entity deletes the at least one earlier CA certificate from the storage medium.

18. The one or more non-transitory computer readable media of claim 12, wherein, with respect to the second phase, removing or deleting the at least one earlier CA certificate from the storage medium associated with the particular network entity comprises:

distributing, to the particular network entity, a second certificate bundle comprising a second set of one or more CA certificates, wherein the second set of one or more CA certificates comprises the at least one new CA certificate, and wherein the second set of one or more CA certificates reflects the at least one earlier CA certificate having been removed from the new set of one or more CA certificates included in a first certificate bundle.

19. The one or more non-transitory computer readable media of claim 12, wherein the second phase further comprises:

for each particular network entity of the plurality of network entities, removing or deleting, from a storage medium associated with the particular network entity, an earlier entity certificate having been issued to the particular network entity based on the at least one earlier CA certificate.

20. The one or more non-transitory computer readable media of claim 1, wherein the second phase comprises, for each particular network entity of the plurality of network entities, removing or deleting, from a storage medium associated with the particular network entity, at least one earlier CA certificate, wherein prior to removing or deleting the at least one earlier CA certificate, the new set of one or more CA certificates comprises: at least one new CA certificate and the at least one earlier CA certificate;

wherein the individual entity information comprises:

at least a first distribution indicator, indicative of the first phase having been completed with respect to the particular network entity, wherein the first distribution indicator comprises an indication of whether the particular network entity has used a new entity certificate in the certificate authentication process;

wherein generating the aggregate metric comprises:

determining a number or a proportion of the plurality of network entities with respect to which the particular network entity has used the new entity certificate in the certificate authentication process;

wherein determining that the one or more transition criteria are satisfied comprises:

determining that the aggregate metric meets a threshold.

21. The one or more non-transitory computer readable media of claim 1, wherein the second phase comprises, for each particular network entity of the plurality of network entities:

identifying a new certificate bundle installed on a storage medium associated with the particular network entity, the new certificate bundle comprising the new set of one or more CA certificates including at least one new CA certificate and at least one earlier CA certificate; and removing or deleting, from the new certificate bundle the at least one earlier CA certificate;

wherein the operations further comprise:

obtaining, for each particular network entity of the plurality of network entities, additional individual entity information associated with a progress of the particular network entity in relation to the second phase, wherein the additional individual entity information comprises:

at least a first additional distribution indicator, indicative of the second phase having been completed with respect to the particular network entity, wherein the first additional distribution indicator comprises an indication of whether the new certificate bundle installed on the storage medium associated with the particular network entity reflects the at least one earlier CA certificate having been removing or deleted;

generating, based on the additional individual entity information for each particular network entity of the plurality of network entities, an aggregate completion metric indicative of an aggregate status of the plurality of network entities in relation to completing the second phase;

determining, based on the aggregate completion metric, that one or more completion criteria are satisfied for completing the second phase of the series of phases of the certificate bundle distribution process, wherein the one or more completion criteria comprises the aggregate completion metric meeting a threshold; and responsive to determining that the one or more completion criteria are satisfied, determining that the second phase of the series of phases of the certificate bundle distribution process is complete.

22. The one or more non-transitory computer readable media of claim 21, wherein obtaining the additional individual entity information comprises:

obtaining, for the particular network entity, the first additional distribution indicator, wherein the first additional distribution indicator comprises a first hash value representing a first certificate bundle installed on the storage medium associated with the particular network entity, wherein the first certificate bundle comprises a plurality of CA certificates;

wherein, with respect to the particular network entity, generating the aggregate completion metric comprises:

comparing the first hash value to a reference hash value representing the new certificate bundle with the at least one earlier CA certificate having been removing or deleted; and determining, based on a match between the first hash value and the reference hash value, that the new certificate bundle installed on the storage medium associated with the particular network entity reflects the at least one earlier CA certificate having been removing or deleted, wherein the match indicates that the first certificate bundle is the new certificate bundle.

23. The one or more non-transitory computer readable media of claim 1, wherein determining that the one or more transition criteria are satisfied comprises:

periodically determining a first number or a first proportion of the plurality of network entities with respect to which the aggregate metric is satisfied; and incrementing a counter, representing the first number or the first proportion of the plurality of network entities with respect to which the aggregate metric is satisfied, until the counter meets a threshold, wherein the one or more transition criteria comprises the counter meeting the threshold.

24. The one or more non-transitory computer readable media of claim 23, wherein the operations further comprise:

displaying an alert indicating a second number or a second portion of the plurality of network entities with respect to which the aggregate metric is unsatisfied; and ceasing displaying the alert when the counter meets the threshold.

25. The one or more non-transitory computer readable media of claim 1, wherein the virtual cloud network comprises: a substrate network, an overlay network, and a network interface comprising a communication pathway between the substrate network and the overlay network;

wherein the plurality of network entities comprises at least one of: a substrate entity located on the substrate network, an overlay entity located on the overlay network, or an interface entity located on the network interface.

26. The one or more non-transitory computer readable media of claim 1, wherein the plurality of network entities comprises at least one of:

at least one host, wherein the virtual cloud network comprises a substrate network and an overlay network, and wherein the at least one host is located on the substrate network or on the overlay network; or at least one service executing or executable on a substrate host located on the substrate network or on an overlay host located on the overlay network.

27. The one or more non-transitory computer readable media of claim 1, wherein the new set of one or more CA certificates comprises: one or more new CA certificates, and one or more earlier CA certificates.

28. A method, comprising:

transitioning a plurality of network entities associated with a virtual cloud network through a series of phases of a certificate bundle distribution process for distributing a new set of one or more certificate authority (CA) certificates to the plurality of network entities for use in a certificate authentication process;

wherein transitioning the plurality of network entities through the series of phases of the certificate bundle distribution process comprises:

executing, by a certificate distribution service hosted on the virtual cloud network, in relation to each of the plurality of network entities, at least a first operation associated with a first phase of the series of phases of the certificate bundle distribution process;

obtaining, by a plurality of event collectors hosted, respectively, on each particular network entity of the plurality of network entities, individual entity information for each particular network entity of the plurality of network entities, the individual entity information for a particular network entity indicating a progress of the particular network entity in relation to the first phase;

detecting, by at least one listening service hosted on the virtual cloud network, the individual entity information obtained by the plurality of event collectors;

responsive to detecting the individual entity information obtained by the plurality of event collectors: transmitting the individual entity information to the certificate distribution service, wherein the certificate distribution service receives the individual entity information;

based on the individual entity information for each particular network entity of the plurality of network entities, generating, by the certificate distribution service, an aggregate metric indicative of an aggregate progress of the plurality of network entities in relation to the first phase;

determining, based on the aggregate metric, that one or more transition criteria are satisfied for transitioning the plurality of network entities from the first phase to a second phase of the series of phases of the certificate bundle distribution process; and responsive to determining that the one or more transition criteria are satisfied, executing, by the certificate distribution service, in relation to each of the plurality of network entities, at least a second operation associated with the second phase of the series of phases of the certificate bundle distribution process;

wherein executing at least the second operation comprises at least one of:

activating a first CA certificate of the new set of one or more CA certificates;

distributing, to a first network entity of the plurality of network entities, a first entity certificate issued to the first network entity based on the first CA certificate of the new set of one or more CA certificates; or removing or deleting a second CA certificate from a storage medium associated with the first network entity;

wherein the method is performed by at least one device including a hardware processor.

29. The method of claim 28, wherein the aggregate metric comprises a confidence measurement indicative of having satisfied the one or more transition criteria associated with the first phase;

wherein determining, based on the aggregate metric, that the one or more transition criteria are satisfied comprises determining that the confidence measurement meets a confidence threshold.

30. The method of claim 28, wherein the new set of one or more CA certificates comprises at least one of: one or more root CA certificates, or one or more intermediate CA certificates.

31. The method of claim 28, wherein obtaining the individual entity information comprises, for the first network entity of the plurality of network entities:

receiving the individual entity information from a certificate event collector hosted by the first network entity;

wherein the individual entity information comprises a cryptographic hash value representing at least one of:

a new certificate bundle comprising the new set of one or more CA certificates;

at least one of the one or more CA certificates in the new certificate bundle; or a new entity certificate having been issued to the particular network entity based on at least one of the one or more CA certificates in the new certificate bundle.

32. The method of claim 28, wherein the first phase comprises distributing, to each particular network entity of the plurality of network entities, a new certificate bundle comprising the new set of one or more CA certificates, wherein the new set of one or more CA certificates comprises at least one new CA certificate;

wherein the second phase comprises activating the at least one new CA certificate;

wherein the individual entity information comprises:

at least a first distribution indicator, indicative of the first phase having been completed with respect to the particular network entity, wherein the first distribution indicator comprises an indication of whether the new certificate bundle is installed on a storage medium associated with the particular network entity; and wherein generating the aggregate metric comprises:

determining a number or a proportion of the plurality of network entities with respect to which the new certificate bundle is installed on the storage medium associated with the particular network entity;

wherein determining that the one or more transition criteria are satisfied comprises:

determining that the aggregate metric meets a threshold.

33. The method of claim 32, wherein obtaining the individual entity information comprises:

obtaining, for the particular network entity, the first distribution indicator, wherein the first distribution indicator comprises a first hash value representing a first certificate bundle installed on the storage medium associated with the particular network entity, wherein the first certificate bundle comprises a plurality of CA certificates;

wherein, with respect to the particular network entity, generating the aggregate metric comprises:

comparing the first hash value to a reference hash value representing the new certificate bundle comprising the new set of one or more CA certificates; and determining, based on a match between the first hash value and the reference hash value, that the new certificate bundle is installed on the storage medium associated with the particular network entity, wherein the match indicates that the first certificate bundle is the new certificate bundle.

34. The method of claim 32, wherein obtaining the individual entity information comprises:

obtaining, for the first network entity of the plurality of network entities, a first instance of the first distribution indicator, wherein the first instance of the first distribution indicator comprises a first hash value representing a first certificate bundle installed on the storage medium associated with the first network entity, wherein the first certificate bundle comprises a first plurality of CA certificates;

wherein, with respect to the first network entity, generating the aggregate metric comprises:

comparing the first hash value to a reference hash value representing the new certificate bundle comprising the new set of one or more CA certificates; and determining a mismatch between the first hash value and the reference hash value, wherein the mismatch indicates that the first certificate bundle mismatches the new certificate bundle; and wherein the method further comprises, prior to determining that the aggregate metric meets the threshold:

determining that the aggregate metric fails to meet the threshold, wherein the aggregate metric fails to meet the threshold at least as a result of the mismatch;

obtaining, for the first network entity, a second instance of the first distribution indicator, wherein the second instance of the first distribution indicator comprises a second hash value representing a second certificate bundle installed on the storage medium associated with the first network entity, wherein the second certificate bundle comprises a second plurality of CA certificates; and further generating the aggregate metric, wherein, with respect to the first network entity, further generating the aggregate metric comprises:

comparing the second hash value to the reference hash value; and determining a match between the second hash value and the reference hash value, wherein the match indicates that the second certificate bundle is the new certificate bundle;

wherein determining that the aggregate metric meets the threshold occurs subsequent to determining the match, wherein the aggregate metric meets the threshold at least as a result of the match.

35. The method of claim 28, wherein the first phase comprises distributing, to each of the plurality of network entities, a new certificate bundle comprising the new set of one or more CA certificates, wherein the new set of one or more CA certificates comprises at least one new CA certificate;

wherein the second phase comprises activating the at least one new CA certificate;

wherein the individual entity information comprises:

at least a first distribution indicator, indicative of the first phase having been completed with respect to the particular network entity, wherein the first distribution indicator comprises an indication of whether the particular network entity has loaded the new certificate bundle;

wherein generating the aggregate metric comprises:

determining a number or a proportion of the plurality of network entities with respect to which the particular network entity has loaded the new certificate bundle;

wherein determining that the one or more transition criteria are satisfied comprises:

determining that the aggregate metric meets a threshold.

36. The method of claim 35, wherein obtaining the individual entity information comprises:

obtaining, for the particular network entity, the first distribution indicator and a second distribution indicator, wherein the first distribution indicator comprises a bundle-load time indicative of a first timestamp for a first certificate bundle being loaded onto a storage medium associated with the particular network entity, wherein the second distribution indicator comprises a restart time indicative of a second timestamp for the particular network entity performing a restart process; and wherein, with respect to the particular network entity, generating the aggregate metric comprises:

comparing the restart time to the bundle-load time;

determining that the restart time is subsequent to the bundle-load time; and determining, based on the restart time being subsequent to the bundle-load time, that the new certificate bundle is loaded onto the storage medium associated with the particular network entity, wherein the restart time being subsequent to the bundle-load time indicates that the first certificate bundle is the new certificate bundle.

37. The method of claim 36, wherein the particular network entity is a first host located on the virtual cloud network, and wherein the restart process comprises rebooting the first host; or wherein the particular network entity is a service executing on a second host located on the virtual cloud network, and wherein the restart process comprises reloading the service.

38. The method of claim 35, wherein obtaining the individual entity information comprises:

obtaining, for the first network entity of the plurality of network entities, a first instance of (i) the first distribution indicator and (ii) a second distribution indicator, wherein the first distribution indicator comprises a bundle-load time indicative of a first timestamp for a first certificate bundle being loaded onto a storage medium associated with the particular network entity, wherein the second distribution indicator comprises a restart time indicative of a second timestamp for the particular network entity performing a restart process; and wherein, with respect to the first instance for the first network entity, generating the aggregate metric comprises:

comparing the restart time to the bundle-load time;

determining that the bundle-load time is subsequent to the restart time; and determining, based on the bundle-load time being subsequent to the restart time, that the new certificate bundle has yet to be loaded onto the storage medium associated with the particular network entity, wherein the bundle-load time being subsequent to the restart time indicates that the first certificate bundle differs from the new certificate bundle;

wherein the method further comprises, prior to determining that the aggregate metric meets the threshold:

determining that the aggregate metric fails to meet the threshold, wherein the aggregate metric fails to meet the threshold at least as a result of the new certificate bundle having yet to be loaded onto the storage medium associated with the particular network entity; and obtaining, for the first network entity, a second instance of (i) the first distribution indicator and (ii) the second distribution indicator;

wherein the second instance of the first distribution indicator comprises a second bundle-load time indicative of a third timestamp for a second certificate bundle being loaded onto the storage medium associated with the particular network entity, wherein the second instance of the second distribution indicator comprises a second restart time indicative of a fourth timestamp for the particular network entity performing a second restart process; and further generating the aggregate metric, wherein, with respect to the second instance for the first network entity, further generating the aggregate metric comprises:

comparing the second restart time to the second bundle-load time;

determining that the second restart time is subsequent to the second bundle-load time; and determining, based on the second restart time being subsequent to the second bundle-load time, that the new certificate bundle is loaded onto the storage medium associated with the particular network entity, wherein the second restart time being subsequent to the second bundle-load time indicates that the second certificate bundle is the new certificate bundle;

wherein determining that the aggregate metric meets the threshold occurs subsequent to determining that the second restart time is subsequent to the second bundle-load time, wherein the aggregate metric meets the threshold at least as a result of the second restart time being subsequent to the second bundle-load time.

39. The method of claim 28, wherein the first phase comprises distributing, to each particular network entity of the plurality of network entities, a new entity certificate having been issued to the particular network entity based on at least one new CA certificate of the new set of one or more CA certificates;

wherein the second phase comprises, for each particular network entity of the plurality of network entities, removing or deleting, from a storage medium associated with the particular network entity, at least one earlier CA certificate, wherein prior to removing or deleting the at least one earlier CA certificate, the new set of one or more CA certificates comprises: the at least one new CA certificate and the at least one earlier CA certificate;

wherein the individual entity information comprises:

at least a first distribution indicator, indicative of the first phase having been completed with respect to the particular network entity, wherein the first distribution indicator comprises an indication of whether the particular network entity has used the new entity certificate in the certificate authentication process;

wherein generating the aggregate metric comprises:

determining a number or a proportion of the plurality of network entities with respect to which the particular network entity has used the new entity certificate in the certificate authentication process;

wherein determining that the one or more transition criteria are satisfied comprises:

determining that the aggregate metric meets a threshold.

40. The method of claim 39, wherein obtaining the individual entity information comprises:

obtaining, for the particular network entity, the first distribution indicator, wherein the first distribution indicator comprises at least a portion of a message transmitted from the particular network entity to an additional network entity in association with the certificate authentication process between the particular network entity and the additional network entity, wherein the message comprises a current entity certificate;

wherein, with respect to the particular network entity, generating the aggregate metric comprises:

determining a match between the current entity certificate and the new entity certificate having been issued to the particular network entity, wherein the match indicates that the current entity certificate is the new entity certificate; and determining, based on the match between the current entity certificate and the new entity certificate, that the new entity certificate is being utilized by the particular network entity in association with the certificate authentication process.

41. The method of claim 40, wherein determining the match between the current entity certificate and the new entity certificate comprises:

performing a validation process upon a first certificate chain comprising the current entity certificate and the at least one new CA certificate of the new set of one or more CA certificates; and determining, based on the validation process, that the first certificate chain is valid;

wherein, based on the new entity certificate having been issued to the particular network entity based on the at least one new CA certificate, the first certificate chain being valid indicates that the current entity certificate is the new entity certificate.

42. The method of claim 40, wherein determining the match between the current entity certificate and the new entity certificate comprises:

comparing a first hash value representing the current entity certificate to a reference hash value representing the new entity certificate;

determining that the first hash value matches the reference hash value; and determining, based on the first hash value matching the reference hash value, that the current entity certificate is the new entity certificate.

43. The method of claim 40, wherein obtaining the individual entity information comprises:

obtaining, for the first network entity of the plurality of network entities, a first instance of the first distribution indicator, wherein the first instance of the first distribution indicator comprises at least a portion of a first message transmitted from the first network entity to a second network entity in association with a first certificate authentication process between the first network entity and the second network entity, wherein the first message comprises the first entity certificate;

wherein, with respect to the first network entity, generating the aggregate metric comprises:

determining a mismatch between the first entity certificate and the new entity certificate having been issued to the first network entity, wherein the mismatch indicates that the first entity certificate differs from the new entity certificate; and wherein the method further comprises, prior to determining that the aggregate metric meets the threshold:

determining that the aggregate metric fails to meet the threshold, wherein the aggregate metric fails to meet the threshold at least as a result of the mismatch;

obtaining, for the first network entity, a second instance of the first distribution indicator;

wherein the second instance of the first distribution indicator comprises at least a portion of a second message transmitted from the first network entity to a third network entity in association with a second certificate authentication process between the first network entity and the third network entity, wherein the second message comprises a second entity certificate; and further generating the aggregate metric, wherein, with respect to the first network entity, further generating the aggregate metric comprises:

determining a first match between the second entity certificate and the new entity certificate having been issued to the first network entity, wherein the first match indicates that the second entity certificate is the new entity certificate;

wherein determining that the aggregate metric meets the threshold occurs subsequent to determining the first match, wherein the aggregate metric meets the threshold at least as a result of the first match.

44. The method of claim 39, wherein, with respect to the second phase, removing or deleting the at least one earlier CA certificate from the storage medium associated with the particular network entity comprises:

transmitting, to the particular network entity, an instruction to delete the at least one earlier CA certificate from the storage medium, wherein, responsive to receiving the instruction, the particular network entity deletes the at least one earlier CA certificate from the storage medium.

45. The method of claim 39, wherein, with respect to the second phase, removing or deleting the at least one earlier CA certificate from the storage medium associated with the particular network entity comprises:

distributing, to the particular network entity, a second certificate bundle comprising a second set of one or more CA certificates, wherein the second set of one or more CA certificates comprises the at least one new CA certificate, and wherein the second set of one or more CA certificates reflects the at least one earlier CA certificate having been removed from the new set of one or more CA certificates included in a first certificate bundle.

46. The method of claim 39, wherein the second phase further comprises:

for each particular network entity of the plurality of network entities, removing or deleting, from the storage medium associated with the particular network entity, an earlier entity certificate having been issued to the particular network entity based on the at least one earlier CA certificate.

47. The method of claim 28, wherein the second phase comprises, for each particular network entity of the plurality of network entities, removing or deleting, from a storage medium associated with the particular network entity, at least one earlier CA certificate, wherein prior to removing or deleting the at least one earlier CA certificate, the new set of one or more CA certificates comprises: at least one new CA certificate and the at least one earlier CA certificate;

wherein the individual entity information comprises:

at least a first distribution indicator, indicative of the first phase having been completed with respect to the particular network entity, wherein the first distribution indicator comprises an indication of whether the particular network entity has used a new entity certificate in the certificate authentication process;

wherein generating the aggregate metric comprises:

determining a number or a proportion of the plurality of network entities with respect to which the particular network entity has used the new entity certificate in the certificate authentication process;

wherein determining that the one or more transition criteria are satisfied comprises:

determining that the aggregate metric meets a threshold.

48. The method of claim 28, wherein the second phase comprises, for each particular network entity of the plurality of network entities:

identifying a new certificate bundle installed on a storage medium associated with the particular network entity, the new certificate bundle comprising the new set of one or more CA certificates including at least one new CA certificate and at least one earlier CA certificate; and removing or deleting, from the new certificate bundle the at least one earlier CA certificate;

wherein the method further comprises:

obtaining, for each particular network entity of the plurality of network entities, additional individual entity information associated with a progress of the particular network entity in relation to the second phase, wherein the additional individual entity information comprises:

at least a first additional distribution indicator, indicative of the second phase having been completed with respect to the particular network entity, wherein the first additional distribution indicator comprises an indication of whether the new certificate bundle installed on the storage medium associated with the particular network entity reflects the at least one earlier CA certificate having been removing or deleted;

generating, based on the additional individual entity information for each particular network entity of the plurality of network entities, an aggregate completion metric indicative of an aggregate status of the plurality of network entities in relation to completing the second phase;

determining, based on the aggregate completion metric, that one or more completion criteria are satisfied for completing the second phase of the series of phases of the certificate bundle distribution process, wherein the one or more completion criteria comprises the aggregate completion metric meeting a threshold; and responsive to determining that the one or more completion criteria are satisfied, determining that the second phase of the series of phases of the certificate bundle distribution process is complete.

49. The method of claim 48, wherein obtaining the additional individual entity information comprises:

obtaining, for the particular network entity, the first additional distribution indicator, wherein the first additional distribution indicator comprises a first hash value representing a first certificate bundle installed on the storage medium associated with the particular network entity, wherein the first certificate bundle comprises a plurality of CA certificates;

wherein, with respect to the particular network entity, generating the aggregate completion metric comprises:

comparing the first hash value to a reference hash value representing the new certificate bundle with the at least one earlier CA certificate having been removing or deleted; and determining, based on a match between the first hash value and the reference hash value, that the new certificate bundle installed on the storage medium associated with the particular network entity reflects the at least one earlier CA certificate having been removing or deleted, wherein the match indicates that the first certificate bundle is the new certificate bundle.

50. The method of claim 28, wherein determining that the one or more transition criteria are satisfied comprises:
   periodically determining a first number or a first proportion of the plurality of network entities with respect to which the aggregate metric is satisfied; and
   incrementing a counter, representing the first number or the first proportion of the plurality of network entities with respect to which the aggregate metric is satisfied, until the counter meets a threshold, wherein the one or more transition criteria comprises the counter meeting the threshold.

51. The method of claim 50, further comprising:
   displaying an alert indicating a second number or a second portion of the plurality of network entities with respect to which the aggregate metric is unsatisfied; and
   ceasing displaying the alert when the counter meets the threshold.

52. The method of claim 28,
   wherein the virtual cloud network comprises: a substrate network, an overlay network, and a network interface comprising a communication pathway between the substrate network and the overlay network;
   wherein the plurality of network entities comprises at least one of: a substrate entity located on the substrate network, an overlay entity located on the overlay network, or an interface entity located on the network interface.

53. The method of claim 28, wherein the plurality of network entities comprises at least one of:
   at least one host, wherein the virtual cloud network comprises a substrate network and an overlay network, and wherein the at least one host is located on the substrate network or on the overlay network; or
   at least one service executing or executable on a substrate host located on the substrate network or on an overlay host located on the overlay network.

54. The method of claim 28, wherein the new set of one or more CA certificates comprises: one or more new CA certificates, and one or more earlier CA certificates.

55. A system comprising:
   at least one device including a hardware processor;
   the system being configured to perform operations comprising:
   transitioning a plurality of network entities associated with a virtual cloud network through a series of phases of a certificate bundle distribution process for distributing a new set of one or more certificate authority (CA) certificates to the plurality of network entities for use in a certificate authentication process;
   wherein transitioning the plurality of network entities through the series of phases of the certificate bundle distribution process comprises:
   executing, by a certificate distribution service hosted on the virtual cloud network, in relation to each of the plurality of network entities, at least a first operation associated with a first phase of the series of phases of the certificate bundle distribution process;
   obtaining, by a plurality of event collectors hosted, respectively, on each particular network entity of the plurality of network entities, individual entity information for each particular network entity of the plurality of network entities, the individual entity information for a particular network entity indicating a progress of the particular network entity in relation to the first phase;

detecting, by at least one listening service hosted on the virtual cloud network, the individual entity information obtained by the plurality of event collectors;
   responsive to detecting the individual entity information obtained by the plurality of event collectors: transmitting the individual entity information to the certificate distribution service, wherein the certificate distribution service receives the individual entity information;
   based on the individual entity information for each particular network entity of the plurality of network entities, generating, by the certificate distribution service, an aggregate metric indicative of an aggregate progress of the plurality of network entities in relation to the first phase;
   determining, based on the aggregate metric, that one or more transition criteria are satisfied for transitioning the plurality of network entities from the first phase to a second phase of the series of phases of the certificate bundle distribution process; and
   responsive to determining that the one or more transition criteria are satisfied, executing, by the certificate distribution service, in relation to each of the plurality of network entities, at least a second operation associated with the second phase of the series of phases of the certificate bundle distribution process;
   wherein executing at least the second operation comprises at least one of:
   activating a first CA certificate of the new set of one or more CA certificates;
   distributing, to a first network entity of the plurality of network entities, a first entity certificate issued to the first network entity based on the first CA certificate of the new set of one or more CA certificates; or
   removing or deleting a second CA certificate from a storage medium associated with the first network entity.

56. The system of claim 55,
   wherein the aggregate metric comprises a confidence measurement indicative of having satisfied the one or more transition criteria associated with the first phase;
   wherein determining, based on the aggregate metric, that the one or more transition criteria are satisfied comprises determining that the confidence measurement meets a confidence threshold.

57. The system of claim 55, wherein the new set of one or more CA certificates comprises at least one of: one or more root CA certificates, or one or more intermediate CA certificates.

58. The system of claim 55, wherein obtaining the individual entity information comprises, for the first network entity of the plurality of network entities:
   receiving the individual entity information from a certificate event collector hosted by the first network entity;
   wherein the individual entity information comprises a cryptographic hash value representing at least one of:
   a new certificate bundle comprising the new set of one or more CA certificates;
   at least one of the one or more CA certificates in the new certificate bundle; or
   a new entity certificate having been issued to the particular network entity based on at least one of the one or more CA certificates in the new certificate bundle.

59. The system of claim 55,
   wherein the first phase comprises distributing, to each particular network entity of the plurality of network entities, a new certificate bundle comprising the new set of one or more CA certificates, wherein the new set of one or more CA certificates comprises at least one new CA certificate;

wherein the second phase comprises activating the at least one new CA certificate;

wherein the individual entity information comprises:

at least a first distribution indicator, indicative of the first phase having been completed with respect to the particular network entity, wherein the first distribution indicator comprises an indication of whether the new certificate bundle is installed on a storage medium associated with the particular network entity; and wherein generating the aggregate metric comprises:

determining a number or a proportion of the plurality of network entities with respect to which the new certificate bundle is installed on the storage medium associated with the particular network entity;

wherein determining that the one or more transition criteria are satisfied comprises:

determining that the aggregate metric meets a threshold.

60. The system of claim 59, wherein obtaining the individual entity information comprises:

obtaining, for the particular network entity, the first distribution indicator, wherein the first distribution indicator comprises a first hash value representing a first certificate bundle installed on the storage medium associated with the particular network entity, wherein the first certificate bundle comprises a plurality of CA certificates;

wherein, with respect to the particular network entity, generating the aggregate metric comprises:

comparing the first hash value to a reference hash value representing the new certificate bundle comprising the new set of one or more CA certificates; and determining, based on a match between the first hash value and the reference hash value, that the new certificate bundle is installed on the storage medium associated with the particular network entity, wherein the match indicates that the first certificate bundle is the new certificate bundle.

61. The system of claim 59, wherein obtaining the individual entity information comprises:

obtaining, for the first network entity of the plurality of network entities, a first instance of the first distribution indicator, wherein the first instance of the first distribution indicator comprises a first hash value representing a first certificate bundle installed on the storage medium associated with the first network entity, wherein the first certificate bundle comprises a first plurality of CA certificates;

wherein, with respect to the first network entity, generating the aggregate metric comprises:

comparing the first hash value to a reference hash value representing the new certificate bundle comprising the new set of one or more CA certificates; and determining a mismatch between the first hash value and the reference hash value, wherein the mismatch indicates that the first certificate bundle mismatches the new certificate bundle; and wherein the operations further comprise, prior to determining that the aggregate metric meets the threshold:

determining that the aggregate metric fails to meet the threshold, wherein the aggregate metric fails to meet the threshold at least as a result of the mismatch;

obtaining, for the first network entity, a second instance of the first distribution indicator, wherein the second instance of the first distribution indicator comprises a second hash value representing a second certificate bundle installed on the storage medium associated with the first network entity, wherein the second certificate bundle comprises a second plurality of CA certificates; and further generating the aggregate metric, wherein, with respect to the first network entity, further generating the aggregate metric comprises:

comparing the second hash value to the reference hash value; and determining a match between the second hash value and the reference hash value, wherein the match indicates that the second certificate bundle is the new certificate bundle;

wherein determining that the aggregate metric meets the threshold occurs subsequent to determining the match, wherein the aggregate metric meets the threshold at least as a result of the match.

62. The system of claim 55, wherein the first phase comprises distributing, to each of the plurality of network entities, a new certificate bundle comprising the new set of one or more CA certificates, wherein the new set of one or more CA certificates comprises at least one new CA certificate;

wherein the second phase comprises activating the at least one new CA certificate;

wherein the individual entity information comprises:

at least a first distribution indicator, indicative of the first phase having been completed with respect to the particular network entity, wherein the first distribution indicator comprises an indication of whether the particular network entity has loaded the new certificate bundle;

wherein generating the aggregate metric comprises:

determining a number or a proportion of the plurality of network entities with respect to which the particular network entity has loaded the new certificate bundle;

wherein determining that the one or more transition criteria are satisfied comprises:

determining that the aggregate metric meets a threshold.

63. The system of claim 62, wherein obtaining the individual entity information comprises:

obtaining, for the particular network entity, the first distribution indicator and a second distribution indicator, wherein the first distribution indicator comprises a bundle-load time indicative of a first timestamp for a first certificate bundle being loaded onto a storage medium associated with the particular network entity, wherein the second distribution indicator comprises a restart time indicative of a second timestamp for the particular network entity performing a restart process; and wherein, with respect to the particular network entity, generating the aggregate metric comprises:

comparing the restart time to the bundle-load time;

determining that the restart time is subsequent to the bundle-load time; and determining, based on the restart time being subsequent to the bundle-load time, that the new certificate bundle is loaded onto the storage medium associated with the particular network entity, wherein the restart time being subsequent to the bundle-load time indicates that the first certificate bundle is the new certificate bundle.

64. The system of claim 63, wherein the particular network entity is a first host located on the virtual cloud network, and wherein the restart process comprises rebooting the first host; or wherein the particular network entity is a service executing on a second host located on the virtual cloud network, and wherein the restart process comprises reloading the service.

65. The system of claim 62, wherein obtaining the individual entity information comprises:

obtaining, for the first network entity of the plurality of network entities, a first instance of (i) the first distribution indicator and (ii) a second distribution indicator, wherein the first distribution indicator comprises a bundle-load time indicative of a first timestamp for a first certificate bundle being loaded onto a storage medium associated with the particular network entity, wherein the second distribution indicator comprises a restart time indicative of a second timestamp for the particular network entity performing a restart process; and wherein, with respect to the first instance for the first network entity, generating the aggregate metric comprises:

comparing the restart time to the bundle-load time;

determining that the bundle-load time is subsequent to the restart time; and determining, based on the bundle-load time being subsequent to the restart time, that the new certificate bundle has yet to be loaded onto the storage medium associated with the particular network entity, wherein the bundle-load time being subsequent to the restart time indicates that the first certificate bundle differs from the new certificate bundle;

wherein the operations further comprise, prior to determining that the aggregate metric meets the threshold:

determining that the aggregate metric fails to meet the threshold, wherein the aggregate metric fails to meet the threshold at least as a result of the new certificate bundle having yet to be loaded onto the storage medium associated with the particular network entity; and obtaining, for the first network entity, a second instance of (i) the first distribution indicator and (ii) the second distribution indicator;

wherein the second instance of the first distribution indicator comprises a second bundle-load time indicative of a third timestamp for a second certificate bundle being loaded onto the storage medium associated with the particular network entity, wherein the second instance of the second distribution indicator comprises a second restart time indicative of a fourth timestamp for the particular network entity performing a second restart process; and further generating the aggregate metric, wherein, with respect to the second instance for the first network entity, further generating the aggregate metric comprises:

comparing the second restart time to the second bundle-load time;

determining that the second restart time is subsequent to the second bundle-load time; and determining, based on the second restart time being subsequent to the second bundle-load time, that the new certificate bundle is loaded onto the storage medium associated with the particular network entity, wherein the second restart time being subsequent to the second bundle-load time indicates that the second certificate bundle is the new certificate bundle;

wherein determining that the aggregate metric meets the threshold occurs subsequent to determining that the second restart time is subsequent to the second bundle-load time, wherein the aggregate metric meets the threshold at least as a result of the second restart time being subsequent to the second bundle-load time.

66. The system of claim 55, wherein the first phase comprises distributing, to each particular network entity of the plurality of network entities, a new entity certificate having been issued to the particular network entity based on at least one new CA certificate of the new set of one or more CA certificates;

wherein the second phase comprises, for each particular network entity of the plurality of network entities, removing or deleting, from a storage medium associated with the particular network entity, at least one earlier CA certificate, wherein prior to removing or deleting the at least one earlier CA certificate, the new set of one or more CA certificates comprises: the at least one new CA certificate and the at least one earlier CA certificate;

wherein the individual entity information comprises:

at least a first distribution indicator, indicative of the first phase having been completed with respect to the particular network entity, wherein the first distribution indicator comprises an indication of whether the particular network entity has used the new entity certificate in the certificate authentication process;

wherein generating the aggregate metric comprises:

determining a number or a proportion of the plurality of network entities with respect to which the particular network entity has used the new entity certificate in the certificate authentication process;

wherein determining that the one or more transition criteria are satisfied comprises:

determining that the aggregate metric meets a threshold.

67. The system of claim 66, wherein obtaining the individual entity information comprises:

obtaining, for the particular network entity, the first distribution indicator, wherein the first distribution indicator comprises at least a portion of a message transmitted from the particular network entity to an additional network entity in association with the certificate authentication process between the particular network entity and the additional network entity, wherein the message comprises a current entity certificate;

wherein, with respect to the particular network entity, generating the aggregate metric comprises:

determining a match between the current entity certificate and the new entity certificate having been issued to the particular network entity, wherein the match indicates that the current entity certificate is the new entity certificate; and determining, based on the match between the current entity certificate and the new entity certificate, that the new entity certificate is being utilized by the particular network entity in association with the certificate authentication process.

68. The system of claim 67, wherein determining the match between the current entity certificate and the new entity certificate comprises:

performing a validation process upon a first certificate chain comprising the current entity certificate and the at least one new CA certificate of the new set of one or more CA certificates; and determining, based on the validation process, that the first certificate chain is valid;

wherein, based on the new entity certificate having been issued to the particular network entity based on the at least one new CA certificate, the first certificate chain being valid indicates that the current entity certificate is the new entity certificate.

69. The system of claim 67, wherein determining the match between the current entity certificate and the new entity certificate comprises:

comparing a first hash value representing the current entity certificate to a reference hash value representing the new entity certificate;

determining that the first hash value matches the reference hash value; and determining, based on the first hash value matching the reference hash value, that the current entity certificate is the new entity certificate.

70. The system of claim 67, wherein obtaining the individual entity information comprises:

obtaining, for the first network entity of the plurality of network entities, a first instance of the first distribution indicator, wherein the first instance of the first distribution indicator comprises at least a portion of a first message transmitted from the first network entity to a second network entity in association with a first certificate authentication process between the first network entity and the second network entity, wherein the first message comprises the first entity certificate;

wherein, with respect to the first network entity, generating the aggregate metric comprises:

determining a mismatch between the first entity certificate and the new entity certificate having been issued to the first network entity, wherein the mismatch indicates that the first entity certificate differs from the new entity certificate; and wherein the operations further comprise, prior to determining that the aggregate metric meets the threshold:

determining that the aggregate metric fails to meet the threshold, wherein the aggregate metric fails to meet the threshold at least as a result of the mismatch;

obtaining, for the first network entity, a second instance of the first distribution indicator;

wherein the second instance of the first distribution indicator comprises at least a portion of a second message transmitted from the first network entity to a third network entity in association with a second certificate authentication process between the first network entity and the third network entity, wherein the second message comprises a second entity certificate; and further generating the aggregate metric, wherein, with respect to the first network entity, further generating the aggregate metric comprises:

determining a first match between the second entity certificate and the new entity certificate having been issued to the first network entity, wherein the first match indicates that the second entity certificate is the new entity certificate;

wherein determining that the aggregate metric meets the threshold occurs subsequent to determining the first match, wherein the aggregate metric meets the threshold at least as a result of the first match.

71. The system of claim 66, wherein, with respect to the second phase, removing or deleting the at least one earlier CA certificate from the storage medium associated with the particular network entity comprises:

transmitting, to the particular network entity, an instruction to delete the at least one earlier CA certificate from the storage medium, wherein, responsive to receiving the instruction, the particular network entity deletes the at least one earlier CA certificate from the storage medium.

72. The system of claim 66, wherein, with respect to the second phase, removing or deleting the at least one earlier CA certificate from the storage medium associated with the particular network entity comprises:

distributing, to the particular network entity, a second certificate bundle comprising a second set of one or more CA certificates, wherein the second set of one or more CA certificates comprises the at least one new CA certificate, and wherein the second set of one or more CA certificates reflects the at least one earlier CA certificate having been removed from the new set of one or more CA certificates included in a first certificate bundle.

73. The system of claim 66, wherein the second phase further comprises:

for each particular network entity of the plurality of network entities, removing or deleting, from a storage medium associated with the particular network entity, an earlier entity certificate having been issued to the particular network entity based on the at least one earlier CA certificate.

74. The system of claim 55, wherein the second phase comprises, for each particular network entity of the plurality of network entities, removing or deleting, from a storage medium associated with the particular network entity, at least one earlier CA certificate, wherein prior to removing or deleting the at least one earlier CA certificate, the new set of one or more CA certificates comprises: at least one new CA certificate and the at least one earlier CA certificate;

wherein the individual entity information comprises:

at least a first distribution indicator, indicative of the first phase having been completed with respect to the particular network entity, wherein the first distribution indicator comprises an indication of whether the particular network entity has used a new entity certificate in the certificate authentication process;

wherein generating the aggregate metric comprises:

determining a number or a proportion of the plurality of network entities with respect to which the particular network entity has used the new entity certificate in the certificate authentication process;

wherein determining that the one or more transition criteria are satisfied comprises:

determining that the aggregate metric meets a threshold.

75. The system of claim 55, wherein the second phase comprises, for each particular network entity of the plurality of network entities:

identifying a new certificate bundle installed on a storage medium associated with the particular network entity, the new certificate bundle comprising the new set of one or more CA certificates including at least one new CA certificate and at least one earlier CA certificate; and removing or deleting, from the new certificate bundle the at least one earlier CA certificate;

wherein the operations further comprise:

obtaining, for each particular network entity of the plurality of network entities, additional individual entity information associated with a progress of the particular network entity in relation to the second phase, wherein the additional individual entity information comprises:

at least a first additional distribution indicator, indicative of the second phase having been completed with respect to the particular network entity, wherein the first additional distribution indicator comprises an indication of whether the new certificate bundle installed on the storage medium associated with the particular network entity reflects the at least one earlier CA certificate having been removing or deleted;

generating, based on the additional individual entity information for each particular network entity of the plurality of network entities, an aggregate completion metric indicative of an aggregate status of the plurality of network entities in relation to completing the second phase;

determining, based on the aggregate completion metric, that one or more completion criteria are satisfied for completing the second phase of the series of phases of the certificate bundle distribution process, wherein the one or more completion criteria comprises the aggregate completion metric meeting a threshold; and responsive to determining that the one or more completion criteria are satisfied, determining that the second phase of the series of phases of the certificate bundle distribution process is complete.

76. The system of claim 75,
wherein obtaining the additional individual entity information comprises:

obtaining, for the particular network entity, the first additional distribution indicator, wherein the first additional distribution indicator comprises a first hash value representing a first certificate bundle installed on the storage medium associated with the particular network entity, wherein the first certificate bundle comprises a plurality of CA certificates;

wherein, with respect to the particular network entity, generating the aggregate completion metric comprises:

comparing the first hash value to a reference hash value representing the new certificate bundle with the at least one earlier CA certificate having been removing or deleted; and determining, based on a match between the first hash value and the reference hash value, that the new certificate bundle installed on the storage medium associated with the particular network entity reflects the at least one earlier CA certificate having been removing or deleted, wherein the match indicates that the first certificate bundle is the new certificate bundle.

77. The system of claim 55, wherein determining that the one or more transition criteria are satisfied comprises:

periodically determining a first number or a first proportion of the plurality of network entities with respect to which the aggregate metric is satisfied; and incrementing a counter, representing the first number or the first proportion of the plurality of network entities with respect to which the aggregate metric is satisfied, until the counter meets a threshold, wherein the one or more transition criteria comprises the counter meeting the threshold.

78. The system of claim 77, wherein the operations further comprise:

displaying an alert indicating a second number or a second portion of the plurality of network entities with respect to which the aggregate metric is unsatisfied; and ceasing displaying the alert when the counter meets the threshold.

79. The system of claim 55,
wherein the virtual cloud network comprises: a substrate network, an overlay network, and a network interface comprising a communication pathway between the substrate network and the overlay network;

wherein the plurality of network entities comprises at least one of: a substrate entity located on the substrate network, an overlay entity located on the overlay network, or an interface entity located on the network interface.

80. The system of claim 55, wherein the individual entity information for each particular network entity, of the plurality of network entities, comprises a hash value associated with the progress of the particular network entity in relation to the first phase.

81. The system of claim 55, wherein generating the aggregate metric indicative of the aggregate progress of the plurality of network entities in relation to the first phase comprises:

generating the aggregate metric based on the individual entity information for each particular network entity of a first subset of network entities, of the plurality of network entities, and without utilizing the individual entity information for a second subset of network entities, of the plurality of network entities, wherein the aggregate metric comprises: a confidence measurement indicative of a level of confidence that the aggregate progress of the plurality of network entities in relation to the first phase satisfies the one or more transition criteria for transitioning from the first phase to the second phase of the series of phases.

82. The system of claim 81, wherein generating the aggregate metric comprises, for each particular network entity of the first subset of network entities:

determining that the one or more transition criteria is satisfied for the particular network entity based at least in part on identifying a match between (a) a hash value associated with the progress of the particular network entity in relation to the first phase and (b) a reference hash value corresponding to completion of the first phase, incrementing a counter representing a portion of the first subset of network entities with respect to which the one or more transition criteria is satisfied, and determining the confidence measurement based on the portion of the first subset of network entities represented by a particular increment of the counter.

83. The system of claim 82, wherein determining that the one or more transition criteria are satisfied comprises:

determining that the one or more transition criteria are satisfied based on the aggregate metric corresponding to the particular increment of the counter, wherein the one or more transition criteria are satisfied prior to obtaining, or without obtaining, the individual entity information for the second subset of network entities.

* * * * *